US011679914B2

(12) United States Patent
Puskur et al.

(10) Patent No.: US 11,679,914 B2
(45) Date of Patent: Jun. 20, 2023

(54) FLUID DISPENSING DEVICE

(71) Applicants: Partha Rao Puskur, Herndon, VA (US); Paul David Maguire, Goochland, VA (US)

(72) Inventors: Partha Rao Puskur, Herndon, VA (US); Paul David Maguire, Goochland, VA (US)

( * ) Notice: Subject to any disclaimer, the term of this patent is extended or adjusted under 35 U.S.C. 154(b) by 0 days.

(21) Appl. No.: 17/524,486

(22) Filed: Nov. 11, 2021

(65) Prior Publication Data
US 2022/0153487 A1 May 19, 2022

Related U.S. Application Data
(60) Provisional application No. 63/114,231, filed on Nov. 16, 2020.

(51) Int. Cl.
B65D 47/28 (2006.01)
B65D 47/32 (2006.01)
B65D 47/20 (2006.01)

(52) U.S. Cl.
CPC .......... B65D 47/28 (2013.01); B65D 47/2093 (2013.01); B65D 47/32 (2013.01)

(58) Field of Classification Search
CPC ..................................... G01F 11/32
USPC ............... 222/354, 414.5, 415, 448, 449
See application file for complete search history.

(56) References Cited

U.S. PATENT DOCUMENTS

| | | | | |
|---|---|---|---|---|
| 1,068,067 A | * | 7/1913 | McPherson | G01F 11/267 222/38 |
| 1,223,207 A | * | 4/1917 | Scypinski | G01F 11/263 222/424.5 |
| 1,260,334 A | * | 3/1918 | Cordley | G01F 11/32 222/453 |
| 1,285,206 A | * | 11/1918 | Johnson et al. | G01F 11/263 222/545 |
| 1,308,258 A | * | 7/1919 | Rose | B65D 25/42 222/340 |
| 1,375,430 A | * | 4/1921 | Walker | G01F 11/38 222/424.5 |
| 1,463,591 A | * | 7/1923 | Pfaffenberger | G01F 11/28 222/448 |
| 1,797,869 A | * | 3/1931 | Kennedy | G01F 11/263 222/452 |
| 1,887,931 A | * | 11/1932 | Kennedy | G01F 11/263 222/444 |
| 1,919,044 A | * | 7/1933 | Schell | B65D 35/40 222/335 |
| 1,938,430 A | * | 12/1933 | Kennedy | G01F 11/263 222/545 |
| 1,949,130 A | * | 2/1934 | Renfro | G01F 11/263 222/454 |
| 1,972,152 A | * | 9/1934 | Lopez | G01F 11/26 222/445 |
| 2,106,649 A | * | 1/1938 | Officer, Jr. | G01F 11/32 222/157 |

(Continued)

Primary Examiner — Paul R Durand
Assistant Examiner — Michael J. Melaragno
(74) Attorney, Agent, or Firm — Resolute Legal PLLC

(57) ABSTRACT

A fluid device generally comprises a staging reservoir which may receive a volume of fluid flowing from a primary reservoir via a coupler upon operation of an actuator, wherein the staging reservoir is usable to measure fluid within the device in order to dispense a desired amount of fluid.

18 Claims, 31 Drawing Sheets

(56) References Cited

U.S. PATENT DOCUMENTS

| | | | | |
|---|---|---|---|---|
| 2,133,679 A * | 10/1938 | Woeltjen | G01F 11/32 | 222/453 |
| 2,148,840 A * | 2/1939 | Rothstein | A47G 19/24 | 222/336 |
| 2,168,050 A * | 8/1939 | Slipikas | G01F 11/32 | 222/445 |
| 2,197,352 A * | 4/1940 | Terkel | F16K 24/02 | 222/542 |
| 2,199,312 A * | 4/1940 | Henry, Jr. | G01F 11/32 | 222/509 |
| 2,216,347 A * | 10/1940 | Humbard | G01F 11/263 | 222/545 |
| 2,248,958 A * | 7/1941 | Christensen | G01F 11/32 | 222/488 |
| 2,475,720 A * | 7/1949 | Preston | G01F 11/263 | 222/510 |
| 2,532,787 A * | 12/1950 | Romyns | G01F 11/32 | 222/453 |
| 2,659,518 A * | 11/1953 | Donnelly | G01F 11/32 | 222/453 |
| 2,873,050 A * | 2/1959 | Halverson | G01F 11/32 | 222/449 |
| 3,080,097 A * | 3/1963 | Schmaus | G01F 11/32 | 222/509 |
| 3,141,574 A | 7/1964 | Donoghue | | |
| 3,141,579 A | 7/1964 | Medlock | | |
| 3,141,585 A * | 7/1964 | Emmert | G01F 11/32 | 222/510 |
| 3,848,774 A * | 11/1974 | Schimke | G01F 11/32 | 222/453 |
| 4,049,144 A * | 9/1977 | Schimke | G01F 11/38 | 285/915 |
| 4,318,500 A * | 3/1982 | Melikian | G01F 11/263 | 222/561 |
| 4,440,323 A * | 4/1984 | Benson | A47K 5/1208 | 222/425 |
| 4,881,667 A * | 11/1989 | Perakis | G01F 11/266 | 222/456 |
| 5,133,482 A * | 7/1992 | Burrows | B67D 3/0029 | 222/481.5 |
| 5,156,300 A * | 10/1992 | Spahni | B05B 11/048 | 222/464.2 |
| 5,454,896 A * | 10/1995 | Harding | B29C 65/3612 | 53/449 |
| 6,186,367 B1 | 2/2001 | Harrold | | |
| 8,439,231 B2 * | 5/2013 | Schroedter | B65B 1/36 | 222/153.13 |
| 8,561,851 B1 * | 10/2013 | Leonoff | F16K 15/147 | 137/853 |
| 9,423,285 B2 * | 8/2016 | Barton | G01F 11/28 | |
| 2003/0127469 A1 * | 7/2003 | Terry | B65D 1/06 | 222/158 |
| 2005/0154357 A1 | 7/2005 | Pinel | | |
| 2007/0059090 A1 | 3/2007 | Ceccarelli et al. | | |
| 2011/0036873 A1 * | 2/2011 | Peckels | B67D 3/0045 | 222/481.5 |
| 2012/0267401 A1 * | 10/2012 | Schroedter | G01F 11/24 | 222/368 |
| 2013/0037575 A1 * | 2/2013 | van der Molen | B05B 11/3087 | 222/207 |
| 2015/0048111 A1 * | 2/2015 | Bellmore | B65D 77/068 | 222/509 |
| 2015/0259188 A1 * | 9/2015 | Smith | B67D 3/0035 | 222/478 |
| 2015/0297463 A1 * | 10/2015 | Barton | A61J 1/1418 | 222/424.5 |
| 2016/0145015 A1 * | 5/2016 | Hoshino | B65D 47/2093 | 222/130 |
| 2019/0077555 A1 * | 3/2019 | Paisley | B65D 47/30 | |
| 2021/0033444 A1 * | 2/2021 | Puskur | B65D 47/06 | |
| 2021/0063220 A1 | 3/2021 | Battle et al. | | |

* cited by examiner

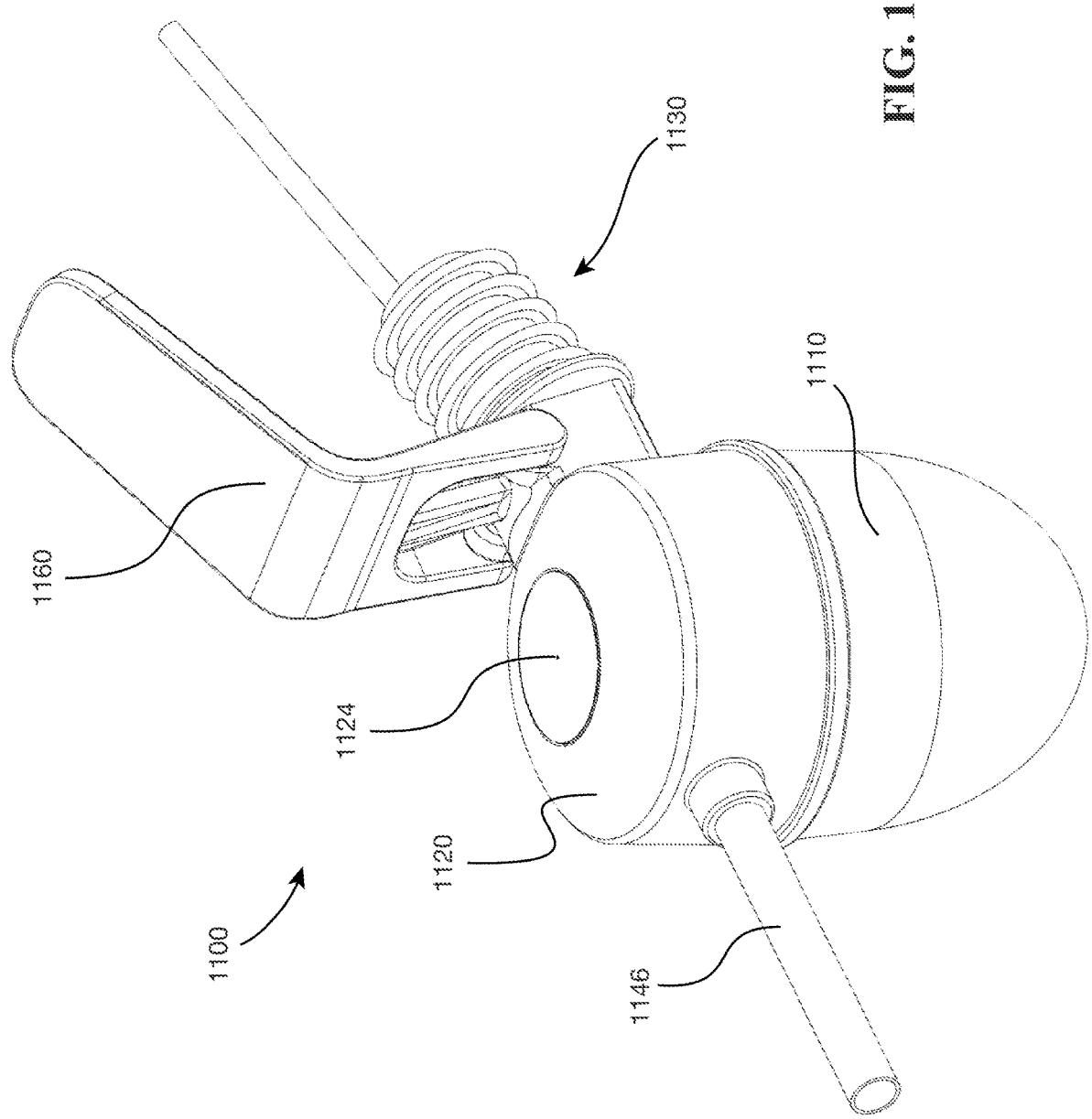

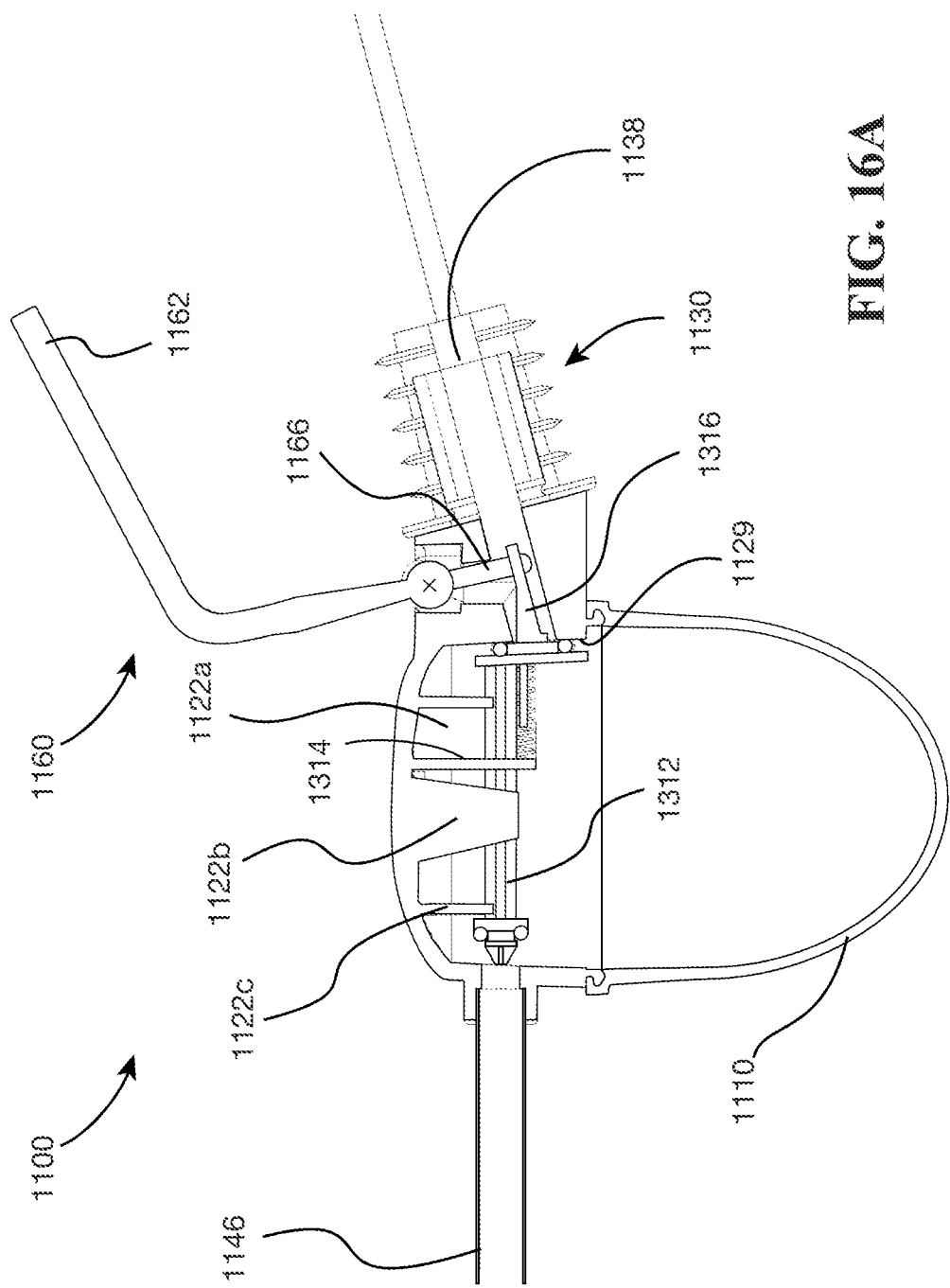

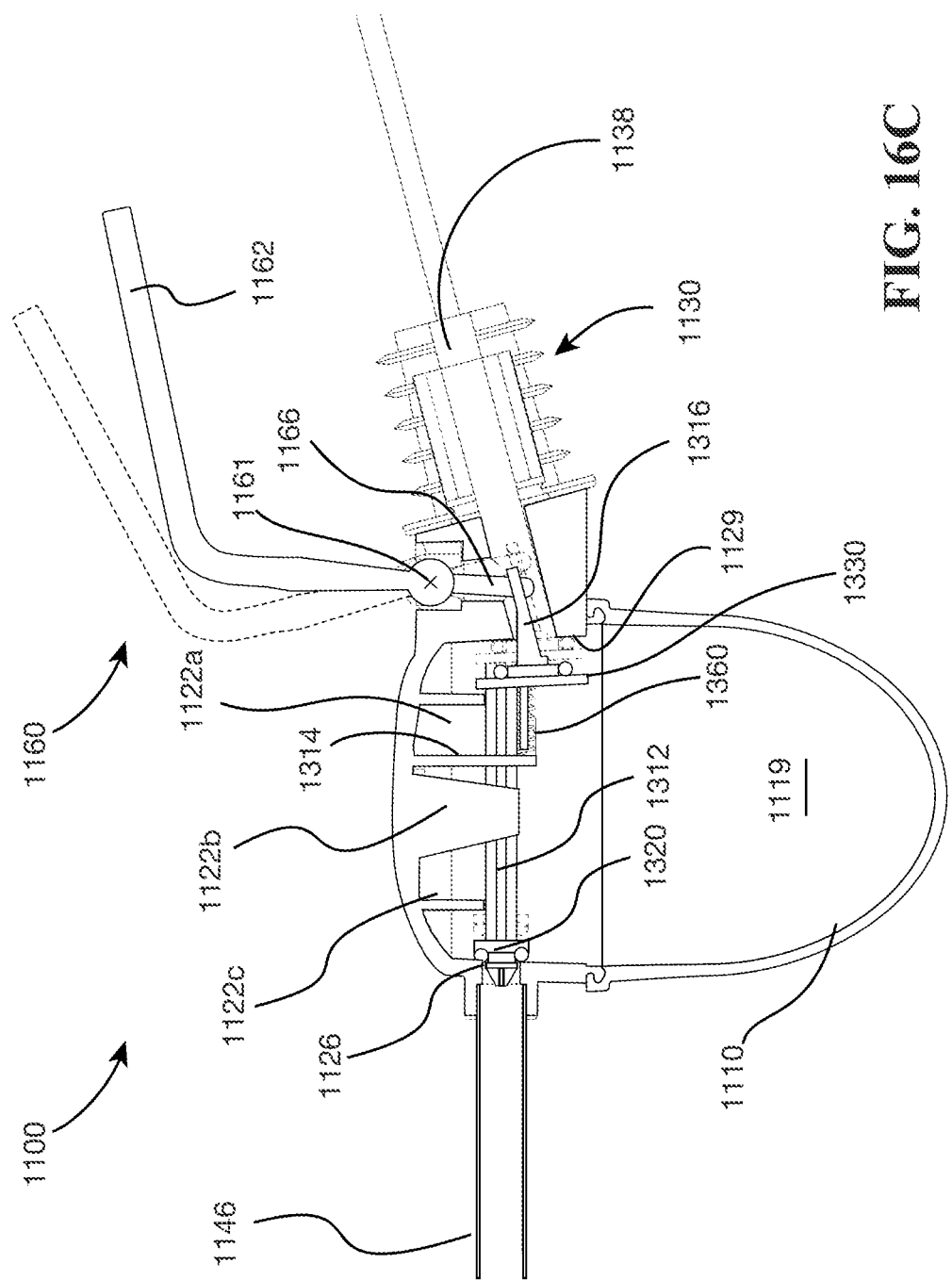

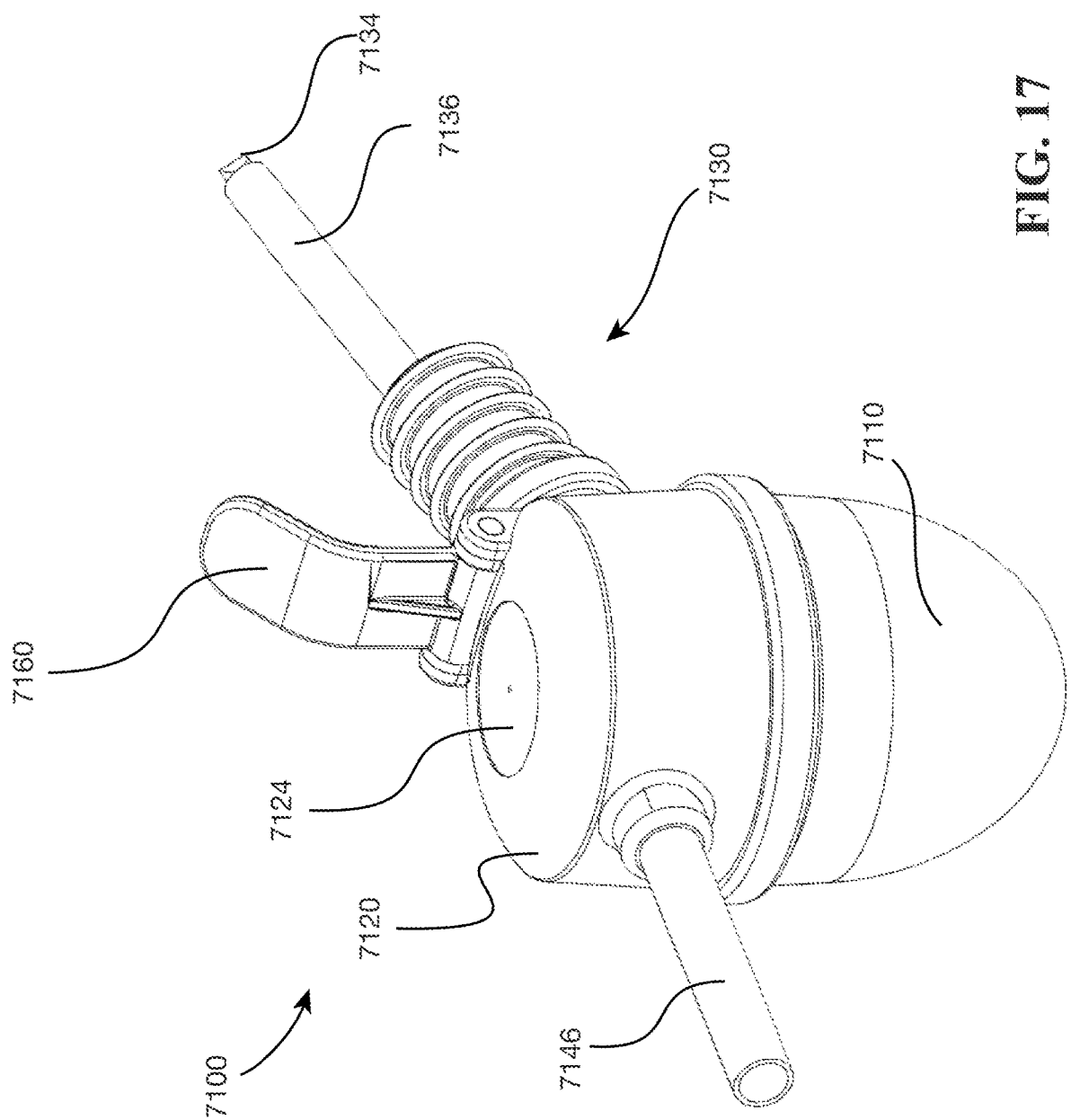

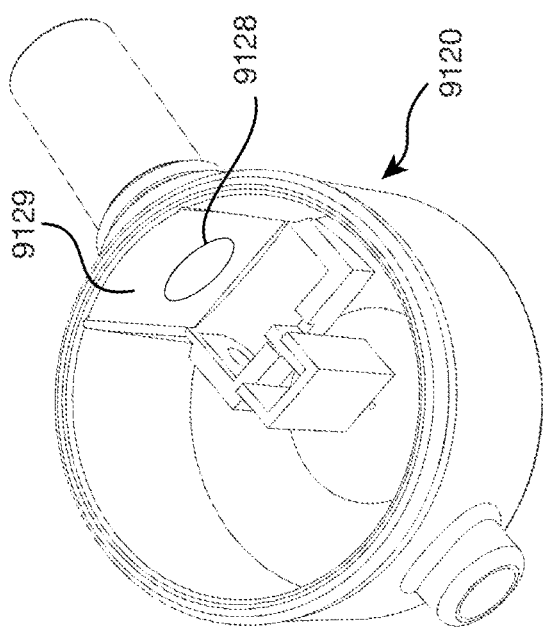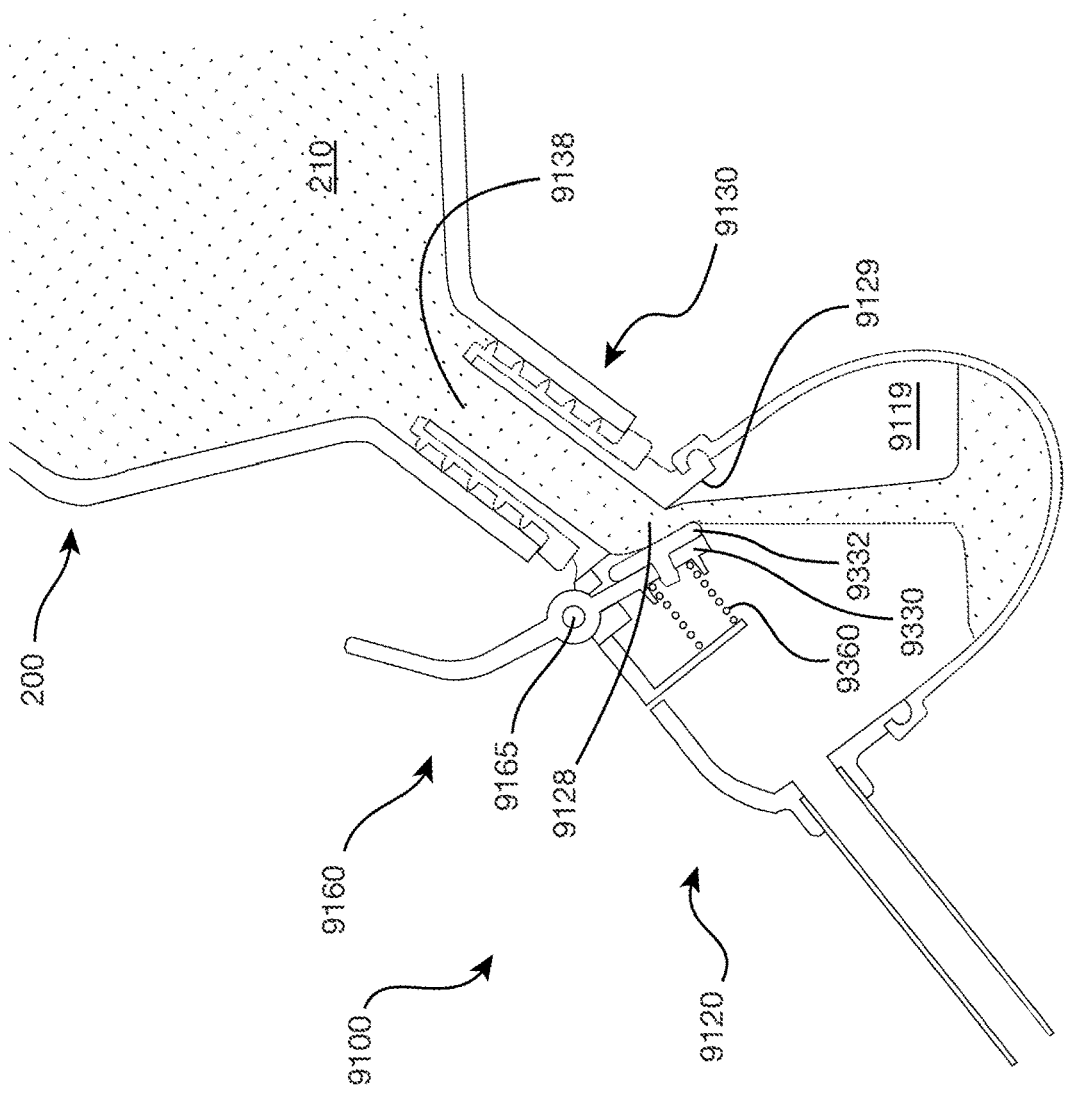

FLUID DISPENSING DEVICE

FIELD OF THE DISCLOSURE

The present disclosure relates to fluid dispensing devices.

SUMMARY

Various implementations of a fluid dispensing device are disclosed. In some implementations, the dispensing device may be removably attachable to a primary reservoir in which a fluid may be disposed. In some implementations, the dispensing device may include a primary reservoir in which a fluid may be disposed. In some implementations, a dispensing device generally comprises a staging reservoir which may receive a volume of fluid flowing from the primary reservoir via a controllable valve body, wherein the staging reservoir is usable to stage fluid within the dispensing device prior to pouring fluid from the dispensing device and is configured to allow a staged volume of fluid to be observed and/or measured in order to dispense a desired amount of fluid. The controllable valve body may be used to prevent further flow of fluid from the primary reservoir following a staging of an amount of fluid and during a pouring of the staged amount of fluid from the device. One of many possible applications for a fluid dispensing device of the present disclosure is food preparation, wherein the device can be used to deliver a measured amount of fluid as may be needed to adhere to a recipe, without requiring the manipulation of a separate measuring device. As such, a single unit may be grasped and manipulated to measure and deliver a desired amount of fluid rather than conventional means which require both the manipulation of a container of fluid, for example a bottle of olive oil, and the manipulation of a measuring device, for example a measuring cup. Alternative methods are particularly cumbersome in comparison when considering one handed operations frequently used in food preparation, wherein alternative methods generally require the following operations: a separate measuring cup is grasped, positioned and released; the olive oil bottle is grasped, manipulated to pour and measure a desired amount of olive oil, repositioned and released; the measuring cup is again grasped, then manipulated to dispense the measured amount, repositioned and released.

BRIEF DESCRIPTION OF THE SEVERAL VIEWS OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of the disclosed subject matter.

FIG. 11 depicts a front isometric view of another example implementation of a fluid dispensing device.

FIGS. 16A, 16B, and 16C depict cross-sectional views of the fluid dispensing device of FIG. 11 with an actuator in different positions.

FIG. 17 depicts a front isometric view of another example implementation of a fluid dispensing device.

FIG. 23A depicts a cross-sectional view of another example implementation of a fluid dispensing device.

FIG. 23B depicts a bottom isometric view of the housing of the fluid dispensing device of FIG. 23A.

DETAILED DESCRIPTION

Various detailed example implementations of a fluid dispensing device are disclosed herein; however, it is to be understood that the disclosed implementations are merely illustrative and may be embodied in various forms. In addition, each of the examples given in connection with the various implementations is intended to be illustrative, and not restrictive.

The following detailed example implementations refer to the accompanying drawings. The same reference number may appear in multiple drawings and when appearing in multiple drawings will identify the same or similar elements.

Figure 1:
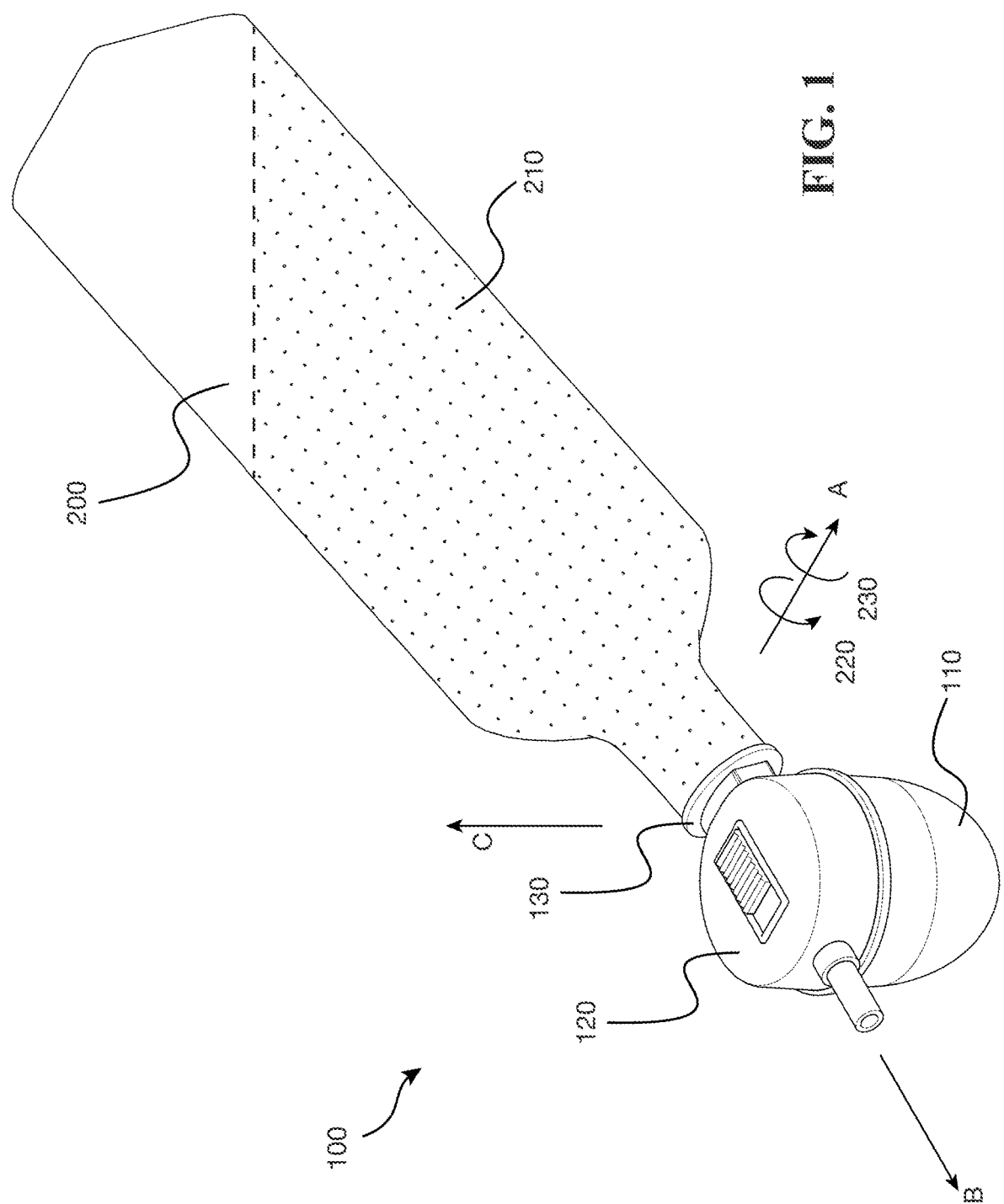
FIG. 1 depicts an isometric view of an example implementation of a fluid dispensing device attached to a primary reservoir.

FIG. 1 depicts an example implementation of a fluid dispensing device 100. Device 100 comprises a fluid staging reservoir 110, a control valve housing 120, and a coupler 130 configured to connect to a primary reservoir 200, such as a bottle of fluid 210. In an example operation, the coupled device 100 and primary reservoir 200 are rotated together about axis A in a counterclockwise direction 220 to move fluid 210 from device 100 along a dispensing path generally in a direction B orthogonal to axis A. Fluid staging reservoir 110 sits generally below a spout 146 relative to an upward-pointing direction C, such that fluid 210 that enters the staging reservoir 110 can be held within the dispensing device before being dispensed from the staging reservoir 110 through the spout 146. In some implementations, axis A and directions B and C define a cartesian coordinate system with three mutually perpendicular planes.

Figure 2:
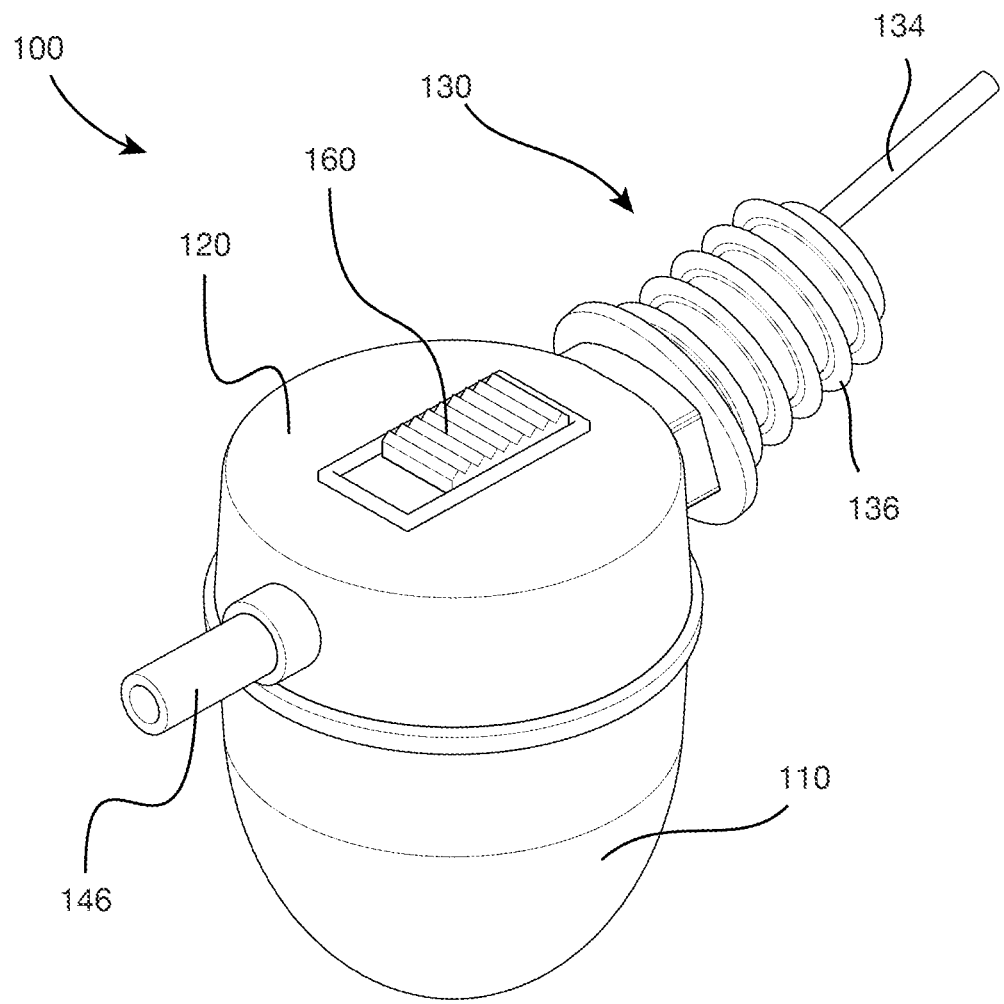
FIG. 2 depicts an isometric view of the fluid dispensing device of FIG. 1 without the primary reservoir.

FIG. 2 depicts an isometric view of the fluid dispensing device of FIG. 1 without a primary reservoir attached. Device 100 is configured to connect to a primary reservoir 200 via coupler 130. Coupler 130 includes a coupler securing body 136 configured to engage and become removably secured to the primary reservoir 200. Actuator 160 is engaged by a user to allow fluid 210 to flow into the control valve housing 120 and collect in the staging reservoir 110. Once a desired quantity of fluid is collected, the actuator 160 can be released, and the device 100 can be rotated in direction 220 to cause the collected fluid to be dispensed from the device 100 through spout 146.

Figure 3:
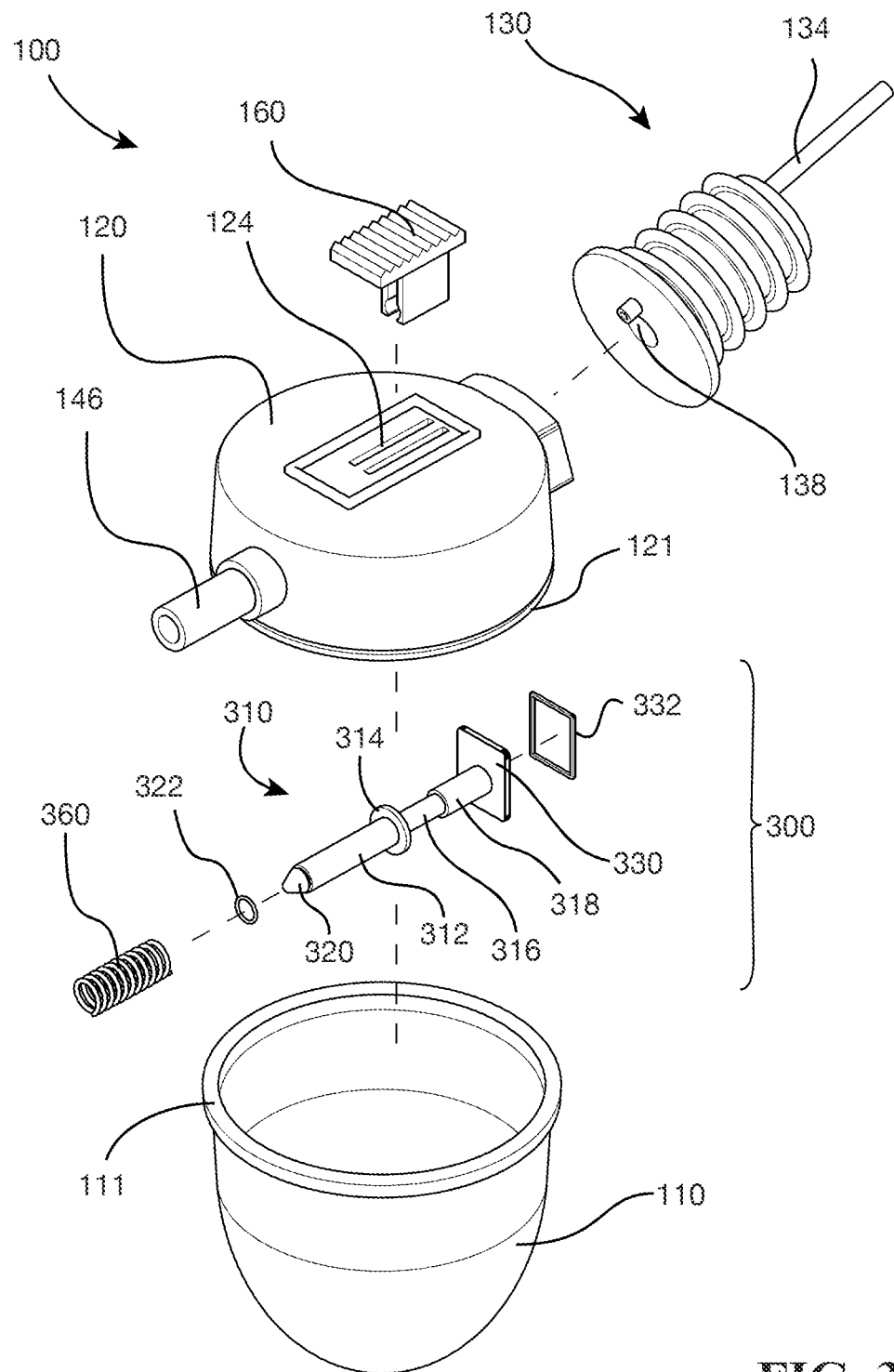
FIG. 3 depicts a top isometric exploded view of the fluid dispensing device of FIG. 1.

FIG. 3 shows an exploded view of the device 100, revealing the control valve assembly 300 that cooperates with actuator 160 to open and close access to and from the control valve housing 120. Control valve assembly 300 includes a control valve body 310 having outlet shaft 312, collar 314, actuator interface 316, and inlet shaft 318. A biasing member 360 is slid over the outlet shaft 312 until it abuts collar 314. Control valve body 310 also includes an outlet seal seat 320 and an inlet seal seat 330. In some implementations outlet seal seat 320 an inlet seal seat 330 may further include outlet seal 322 and inlet seal 332, respectively, each of which may substantially surround the periphery of the outlet seal seat 320 and the inlet seal seat 330, respectively. In some implementations, outlet seal 322 and inlet seal 332 are elastomeric gaskets, such as O-rings or rectangular rings.

FIG. 3 further shows the staging reservoir 110 below control valve housing 120. Staging reservoir 110 is removably attached to the control valve housing 120 via a staging reservoir securing surface 111 that cooperates with a control valve housing securing surface 121 to create a seal between the control valve housing 120 and the staging reservoir 110. In some implementations, each of the securing surfaces 111 and 121 substantially surround the periphery of each of the staging reservoir and control valve housing, respectively, to create a common volume 119 therebetween (see FIG. 9A) when brought together. The volume of staging reservoir 110 makes up the majority of the common volume, and is the primary volume where the fluid is measured. The volume contained within the control valve housing is primarily utilized during filling or dispensing of fluid to and from the device, respectively.

Figure 9A:
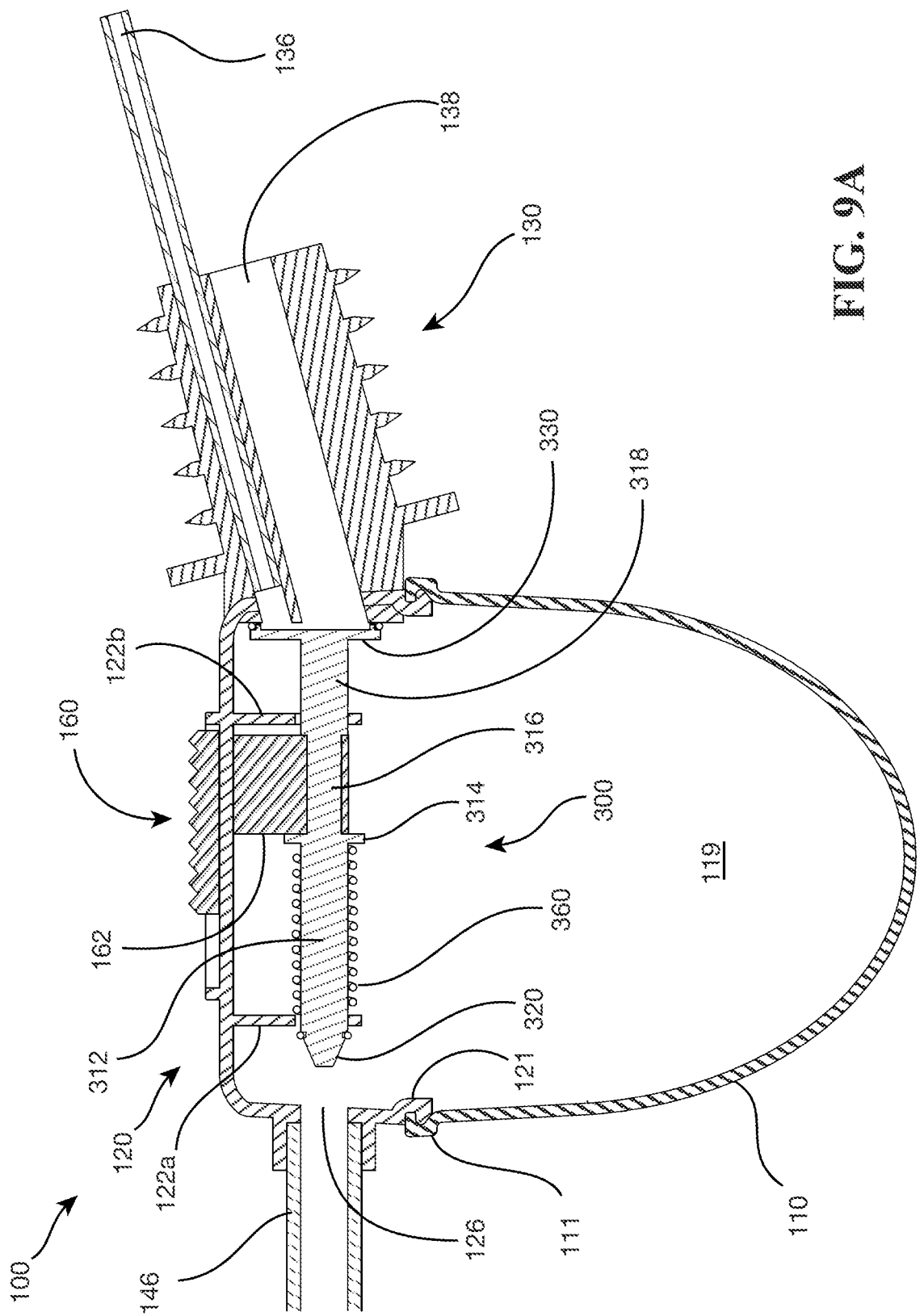
FIGS. 9A, 9B, and 9C depict cross-sectional views of the fluid dispensing device of FIG. 1 with an actuator in different positions.

In some implementations staging reservoir securing surface 111 and control valve housing securing surface 121 form a seal through a snap fit, with one surface having a protrusion and the other surface having an indentation into which the protrusion is pressed (as seen, for example, in FIG. 9A). In some implementations staging reservoir securing surface 111 and valve housing securing surface 121 form a seal through a friction fit. In some implementations staging reservoir securing surface 111 and valve housing securing surface 121 form a seal through a threaded connection. In some implementations staging reservoir securing surface 111 and valve housing securing surface 121 form a seal through a magnetic fit.

In some implementations, staging reservoir sealing surface 111 and valve housing sealing surface 121 mate along a substantially enclosed space, such as a circle, defining a plane, with the control valve housing 120 (including the fluid inlet 128 and outlet 126) are on one side of the plane and the staging reservoir 110 is on the other side of the plane. In some implementations, reservoir sealing surface 111 and valve housing sealing surface 121 mate along a non-planar surface. In some implementations, staging reservoir 110 and securing surface 111 are made of the same material in some implementations. In other implementations, securing surface 111 is made from a flexible material such as silicone, whereas the remainder of the staging reservoir 110 is made from a rigid material. In some implementations the shape of the staging reservoir is narrower at the bottom of the staging reservoir 110 (opposite the securing surface 111) to enable small volumes of dispensed fluid to be measured more accurately, similar to a conical measuring cup.

Figure 4:
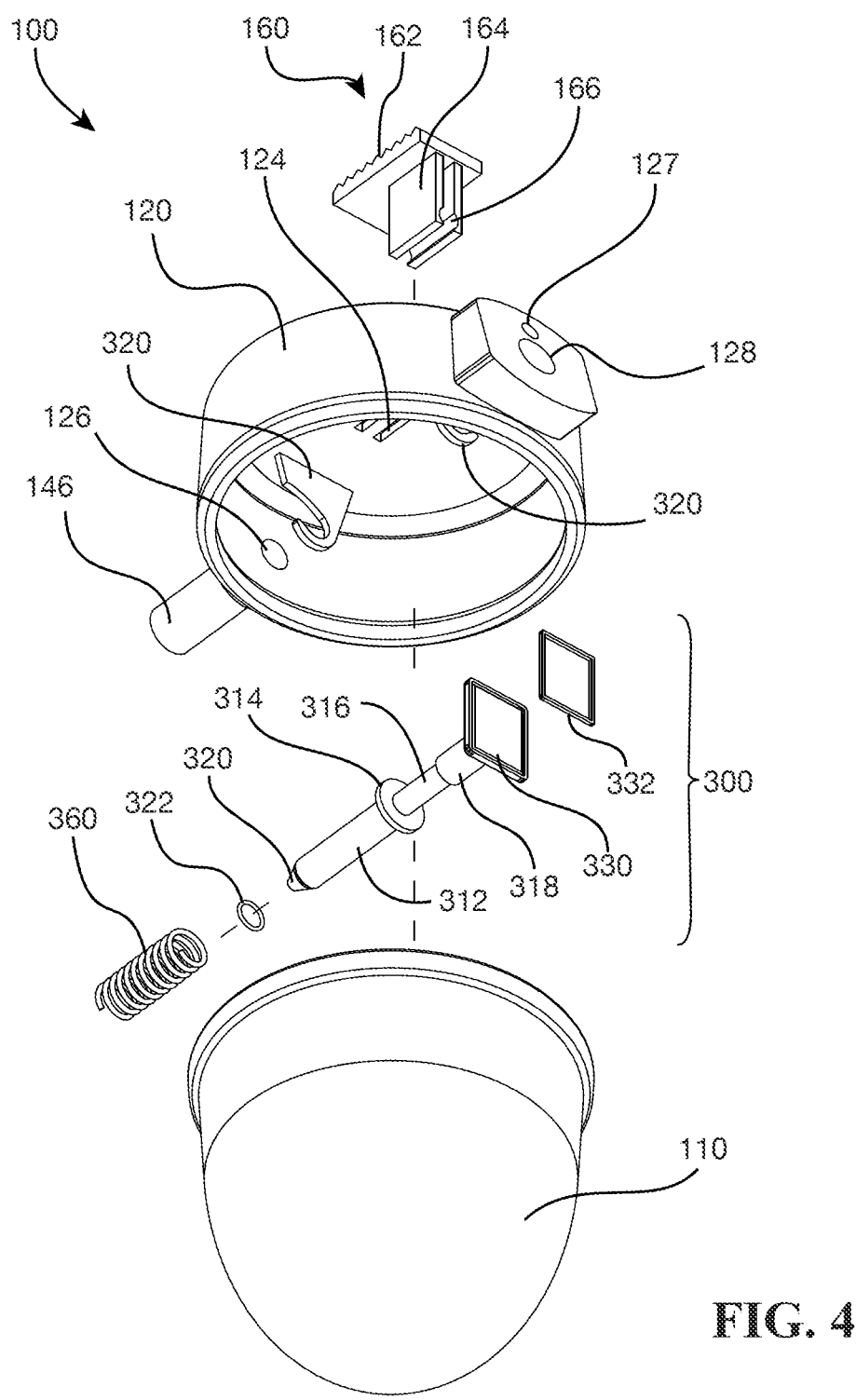
FIG. 4 depicts a bottom isometric exploded view of the fluid dispensing device of FIG. 1.

FIG. 4 provides another angle of the exploded view of device 100. Actuator 160 includes on a top side thereof a user engagement portion 162 that a user engages to operate the device 100. One or more posts 164 extend from a bottom side of the actuator 160, and include a securing interface 166. In the example implementation of FIG. 4, the securing interface 166 is formed as a channel defined between two posts 164. The securing interface 166 of the actuator 160 cooperates with the actuator interface 316 of the control valve body 310 to constrain movement of the control valve body 310 as well as transfer movement of the user engagement portion 162 to the control valve body 310 in order to selectively seal and unseal various apertures extending through the control valve housing 120, described more fully below.

As shown in FIG. 3, coupler 130 includes a fluid path 138 through which fluid flows, and an air relief conduit 134. Coupler 130 is connected to or is formed integrally with control valve housing 120 such that fluid path 138 is aligned and in fluid connection with common volume 119 through fluid inlet 128, and air relief conduit 134 is aligned and in fluid communication with the common volume 119 through air relief aperture 127. In some implementations of device 100, the common volume 119 is in fluid communication through the one or more slots 124 in the control valve housing 120 to return the common volume 119 to atmospheric pressure as the common volume 119 fills with fluid through fluid inlet 128 or empties fluid through fluid outlet 126 (and further out of spout 146).

It should be noted that in some implementations device 100 is manufactured as a substantially unitary structure, where coupler 130 and control valve housing 120, as well as apertures therethrough, may refer to the same point, part, location, component, feature and the like of device 100.

Figures 5A, 5B:
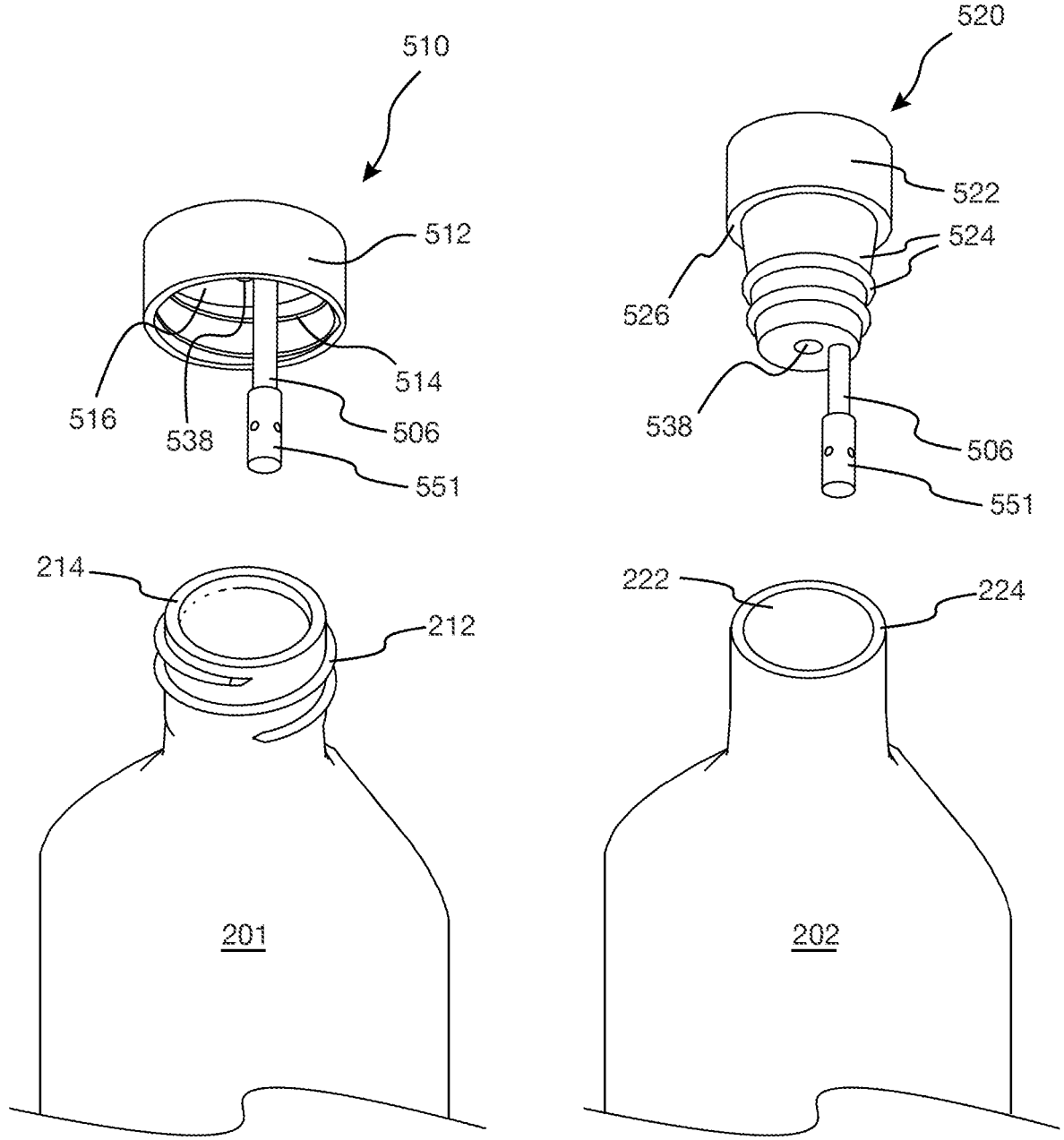
FIGS. 5A and 5B depict alternate implementations of a coupler of a fluid dispensing device.

A primary reservoir may be one of many possible containers comprising fluid, such as a commercially available bottle of olive oil. FIG. 5A depicts an example primary reservoir 201. In some implementations, threaded coupler 510 can be configured with similar features to a screw-on bottle cap, wherein a threaded bottle cap can be removed from a primary reservoir 201 and threaded coupler 510 can be screwed on in its place. Threaded coupler 510 includes an interface in the form of coupler mating surface 514 in securing body 512, wherein the coupler mating surface 514 comprises screw threads to mate and thread onto a primary reservoir mating surface 212 comprising corresponding mating screw threads. In some implementations, securing body 512 further comprises a coupler sealing surface 516 which seals against a primary reservoir sealing surface 214 when threaded coupler 510 is sufficiently rotated onto primary reservoir 201. This arrangement allows fluid held within primary reservoir 201 to controllably pass through fluid path 538 in coupler 510 with little to no spillage. In some implementations air return conduit 506 extends from the coupler sealing surface 516 and, in some implementations, terminates in a check valve 551 to substantially prevent flow of fluid into the air return conduit 506 during a pouring operation.

FIG. 5B depicts an example implementation of an elastic coupler 520 comprising features similar to a bottle stopper, wherein a device 100 comprising an elastic coupler 520 can be removably attached to a primary reservoir 202 by pressing an elastic coupler mating surface 524 on or integral with securing body 522 into a primary reservoir mating surface 222 such that a frictional retention and removable structural attachment is achieved. Coupler mating surface 524 may be comprised of a flexible or compressible material, such as, but not limited to, cork, plastic, or a food grade silicone rubber, to provide a persisting elastic force and a conforming characteristic of coupler mating surface 524, thereby enhancing frictional retention thereof. In the example implementation of FIG. 5B, coupler mating surface 524 and a coupler sealing surface 526 can be the same surface. Furthermore, primary reservoir mating surface 222 and a primary reservoir sealing surface 224 can be the same surface. As such, a coupler 520 comprised of a compressible material providing a conforming characteristic of coupler mating surface 524 may further improve a seal achieved between coupler sealing surface 526 and primary reservoir sealing surface 224. This arrangement allows fluid held within primary reservoir 201 to controllably pass through fluid path 538 in coupler 520 with little to no spillage. It should be appreciated that the mechanism to attach a coupler to a primary reservoir can be other suitable coupling mechanisms (e.g., locking bayonet couplers, glue, welding, etc.).

In some implementations, the coupler 510/520 further includes a air return conduit 506. Air return conduit 506 allows air to flow into an attached primary reservoir 201/202 and occupy volume made available by fluid flowing from the attached primary reservoir 201/202 and through the fluid path 138. In some implementations, coupler 510/520 further includes a check valve 551 that cooperates with air relief aperture 127 to allow air to flow into primary reservoir 201/202, but restrict fluid from flowing into the conduit 506.

Figure 6:
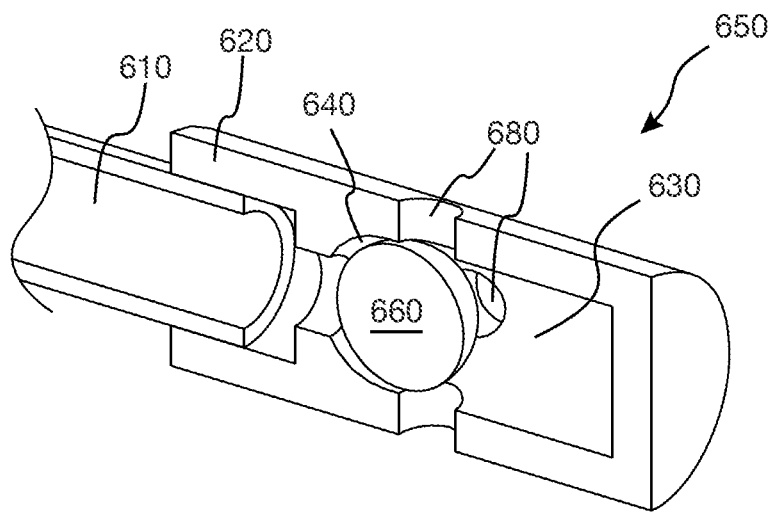
FIG. 6 depicts a cross sectional view of the check valve of FIGS. 5A and 5B.

Shown in the cross-sectional view of FIG. 6, in some implementations check valve 650 comprises a housing 620 attached to air relief conduit 610. Check valve housing 620 comprises a check valve seat 640 and one or more check valve outlets 680, a movable seal 660 disposed in a volume 630 inside the housing 620. In some implementations, check valve seat 640 is positioned between air relief conduit 610 and moveable seal 660 such that air flow entering the check valve 650 from air relief conduit 610 may move movable seal 660 away from check valve seat 640 allowing air flow through check valve seat 640 and further through one or more check valve outlets 680. Check valve outlets 680 are located on the same side of check valve seat 640 as moveable seal 660. Fluid attempting to flow into check valve outlets 680 toward return air conduit 610 can move moveable seal 660 to seat it against check valve seat 640 thereby creating a seal and preventing the flow of fluid through check valve 650 and into air relief conduit 610.

Moveable seal 660 and check valve seat 640 can be of various geometries which provide a fluid seal when seated together and provide for air flow when not seated together. For example, moveable seal 660 can comprise a smooth spherical geometry and check valve seat 640 may comprise a mating smooth bowl shape geometry comprising an air flow path in the base of the bowl. FIG. 6 shows movable seal 660 partially removed from check valve seat 640. In this position, air entering the check valve 650 through return air conduit 610 can move past the check valve seat 640, around the movable seal 660, and out of check valve outlets 680.

Figure 7A:
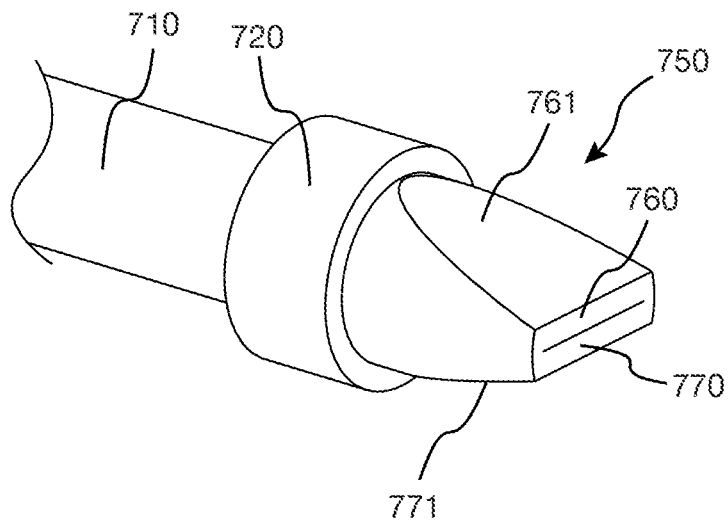
FIG. 7A depicts an alternate implementation of a check valve of a fluid dispensing device.
Figure 7B:
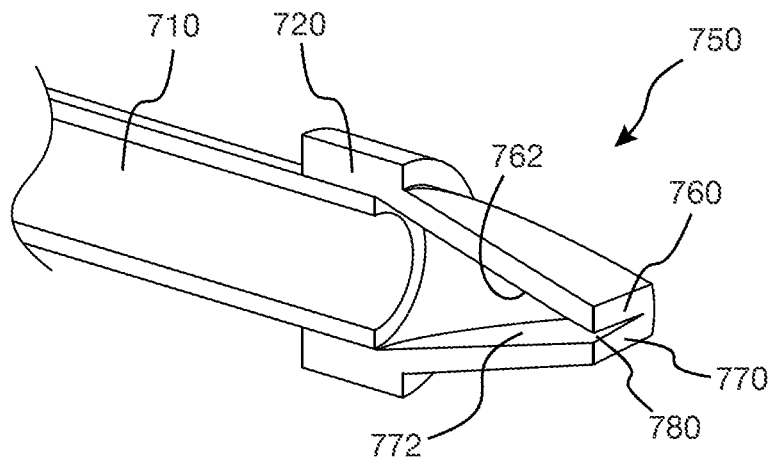
FIG. 7B depicts a cross section of the alternate implementation of the check valve of FIG. 7A.

FIGS. 7A and 7B show an alternate implementation of a check valve 750. Check valve 750 is in the form of a duckbill valve having a valve body 720 attached to an air relief conduit 710. Extending from the valve body 720 are two adjacent elastomeric flaps 760 and 770 with external surfaces 761 and 771, respectively. As seen in the cross-sectional view of FIG. 7B, flaps 760 and 770 have internal surfaces 762 and 772, respectively. When air enters the check valve 750 through air relief conduit 710, the pressure of the air acts on internal surface 762/772 to open the flaps 760/770, creating an opening 780 through which the air can enter a primary reservoir. When fluid presses against the external surfaces 761/771 of the flaps 760/570, the flaps are biased together to seal off entry into the valve body 720. Check valves come in many different varieties, such as swing valves, tilting disc valves, diaphragm valves, etc., each of which can be used herein to provide one-way fluid flow operation.

Figure 8A:
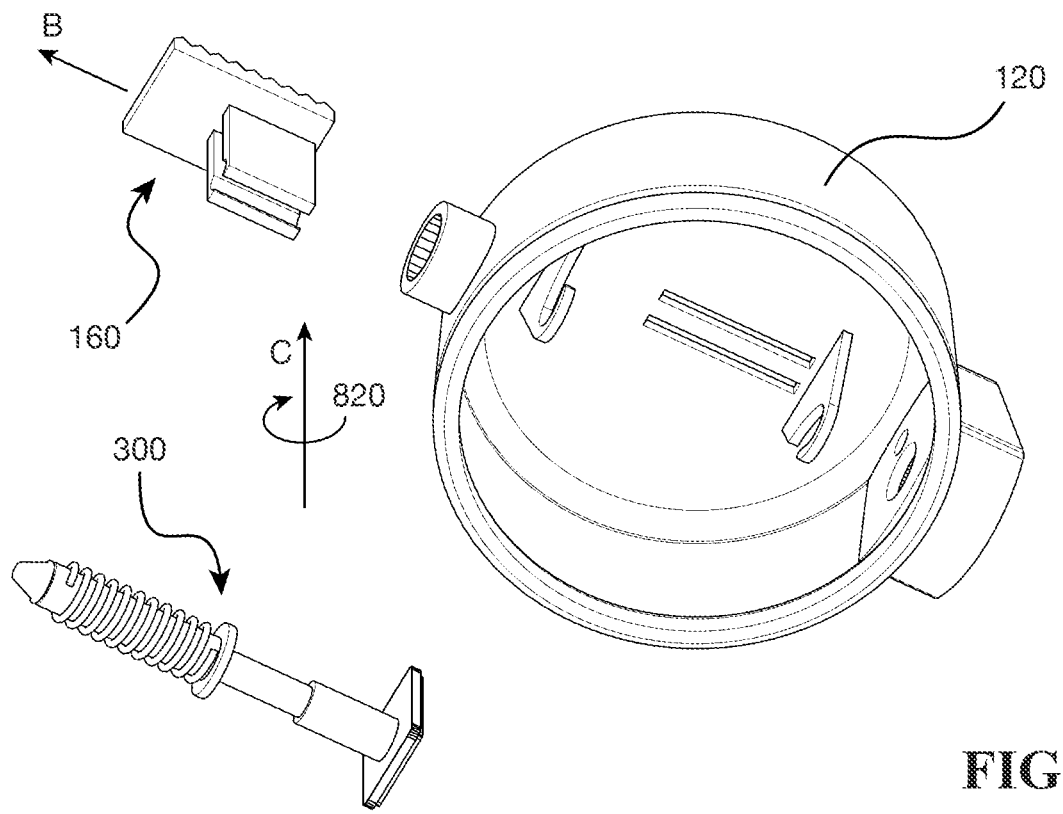
FIGS. 8A, 8B, 8C, and 8D depict bottom isometric views of an assembly operation for the fluid dispensing device of FIG. 1.
Figure 8B:
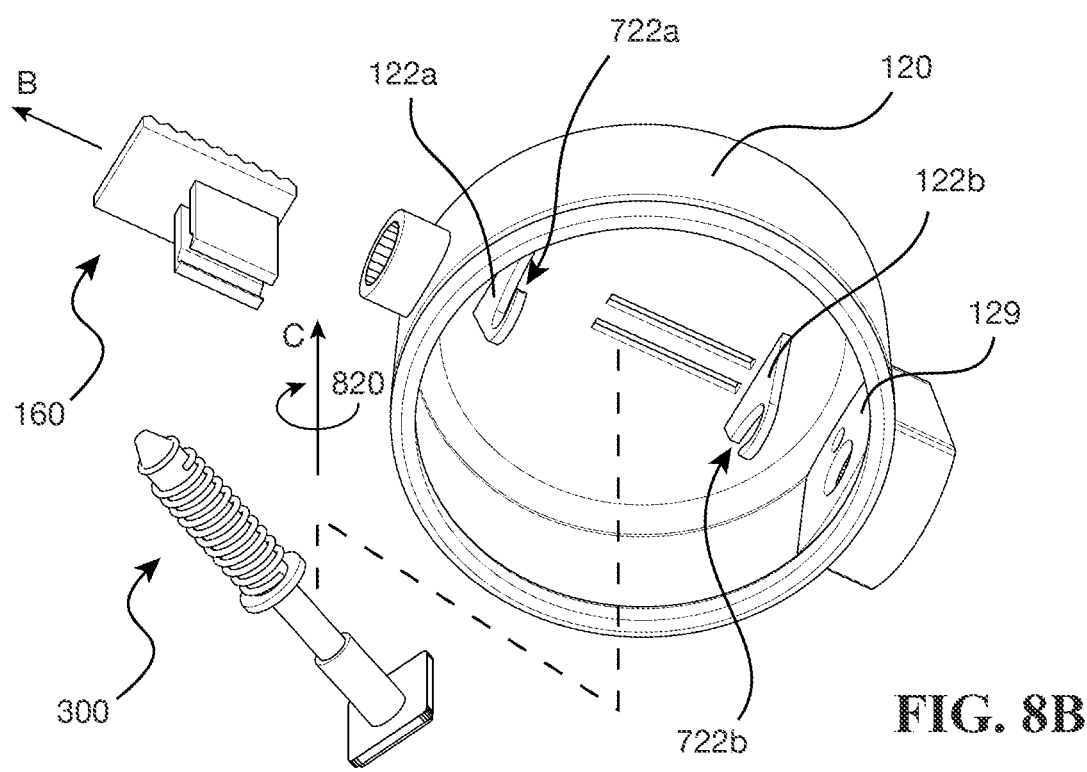
Figure 8C:
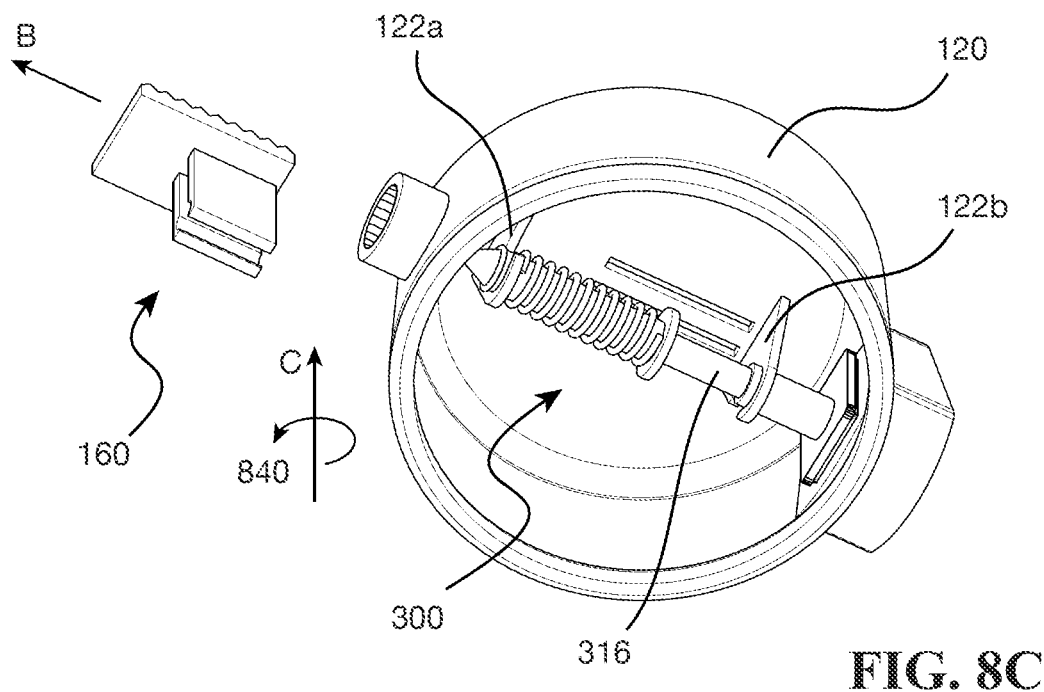
Figure 8D:
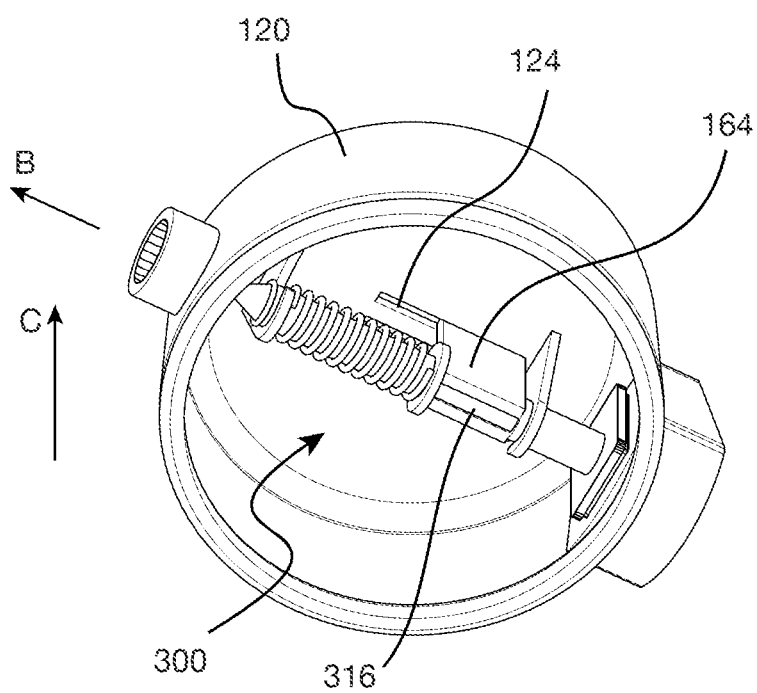

FIGS. 8A-8D show an example method of assembling the control valve assembly 300, the control valve housing 120, and the actuator 160. FIG. 8A shows example relative starting positions of the control valve assembly 300, the control valve housing 120, and the actuator 160, with valve assembly 300 being aligned generally parallel to direction B. In FIG. 8B the valve assembly 300 is rotated in clockwise direction 820 about line C. This position allows the outlet shaft 312 and inlet shaft 318 to move past valve guides 122*a* and 122*b*, respectively, to become aligned with the apertures 722*a* and 722*b*. Valve assembly 300 is then rotated counterclockwise in direction 840 to be secured within the apertures 722*a* and 722*b* of the valve guides 122*a* and 122*b* in a position substantially parallel to direction B as shown in FIG. 8C. In order for the outlet shaft 312 to sit into aperture 722*a*, the biasing member 360 is compressed against collar 314. Once released, the biasing member 360 will push against the valve guide 122*a* and collar 314 to bias the valve body 310 in a direction opposite direction B and toward inlet sealing surface 129 (shown in FIG. 8B). Once the valve assembly 300 is secured in the valve guides 122*a* and 122*b*, the one or more posts 164 of the actuator 160 are slid into corresponding slots 124 in control valve housing 120 such that the securing interface 166 of the actuator 160 securely engages the actuator interface 316 of the valve body 310. This engagement of the securing interface 166 and actuator interface 316 prevents valve assembly 300 from rotating about direction C, as well as constrains the movement of the actuator 160 in the C direction, while allowing linear movement of the actuator 160 within the valve guides 122*a*/122*b* in the B direction.

Figure 9B:
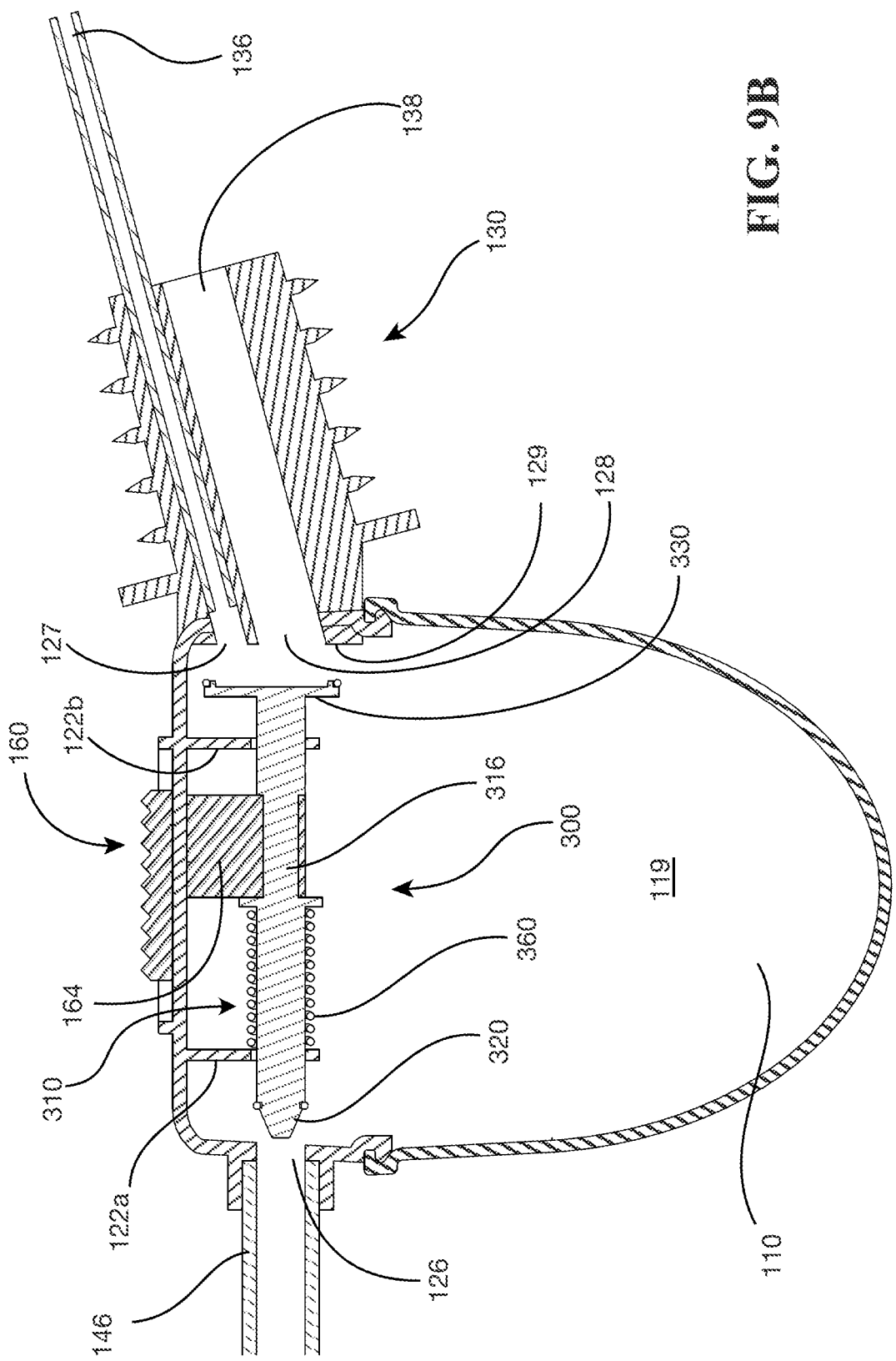
Figure 9C:
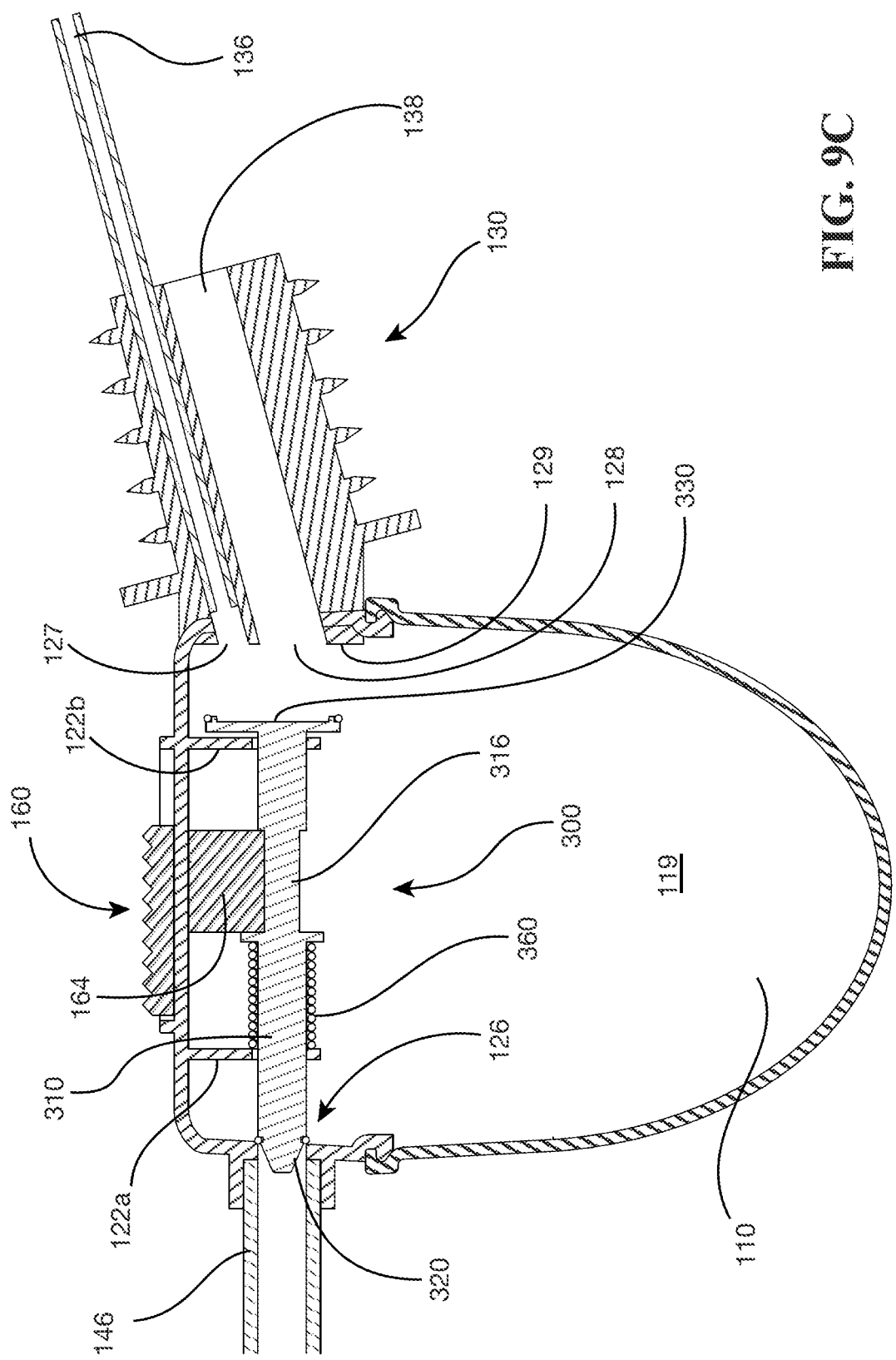

FIG. 9A-9C provide cross-sectional views of the device with the actuator 160 in three different positions. In FIG. 9A, actuator 160 of device 100 is in its default position, with biasing member 360 pushing the collar 314 of valve body 310 toward the coupler 130. In this position, inlet seal seat 330 is pressed against the inlet sealing surface 129 of the valve housing 120, sealing off apertures 127 and 128 from common volume 119, thereby preventing fluid flow between the common volume 119 and an attached primary reservoir 200.

In FIG. 9B, actuator 160 is in an intermediate position where valve body 310 is moved against a biasing force of the biasing member 360 towards the spout 146 without blocking fluid outlet 126 with outlet seal seat 320. In this position, inlet seal seat 330 is moved away from the inlet sealing surface 129, allowing fluid and air to be exchangeable through apertures 128 and 127, respectively, between the common volume 119 and an attached primary reservoir 200, for example, while simultaneously allowing fluid to flow out of spout 146 from the common volume 119.

In FIG. 9C, the actuator 160 is in an outlet sealing position, where outlet seal seat blocks the fluid outlet, preventing fluid flow from common volume 119 out of spout 146. In the outlet sealing position, valve assembly 300 remains apart from inlet sealing surface 129, keeping the apertures 128 and 127 open and in fluid communication with the common volume 119.

Device 100 may be configured such that actuator 160 may, in a one-hand operation, be operated while also holding and manipulating device 100 and an attached primary reservoir 200. In some implementations, device 100 may be configured to be grasped between a thumb and fingers of a hand, with the thumb engaging the user engagement portion 162 of actuator 160. The device is operated by sliding the actuator 160 along slots 124 with the user's thumb pushing the user engagement portion 162 while the fingers and palm of the same hand may at least partially grasp and/or provide support for an attached primary reservoir 200.

Figure 10A:
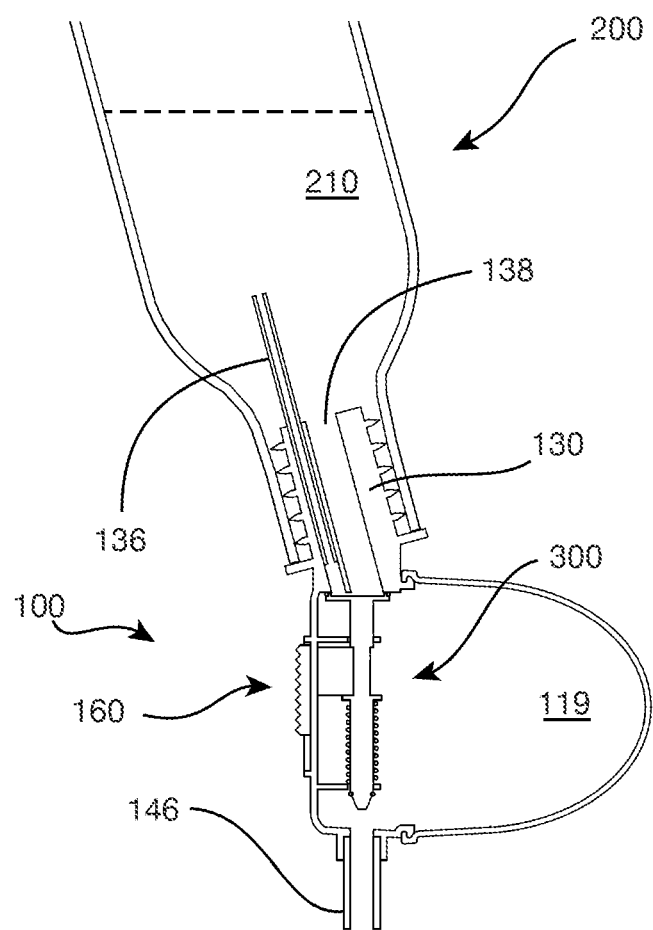
FIGS. 10A, 10B, 10C, 10D, and 10E depict the fluid dispensing device of FIG. 1 in various dispensing modes.

FIGS. 10A-10E show various dispensing scenarios. In FIG. 10A, device 100 is coupled to a primary reservoir 200 via coupler 130. A fluid 210 held within primary reservoir 200 fills fluid path 138. Valve assembly 300 is in the position shown in FIG. 9A, with the actuator 160 in a default position, blocking flow through the coupler 130 and into common volume 119. Air relief conduit 134 is also blocked off from the common volume 119 by the inlet seal seat 330 and inlet seal 332.

Figure 10B:
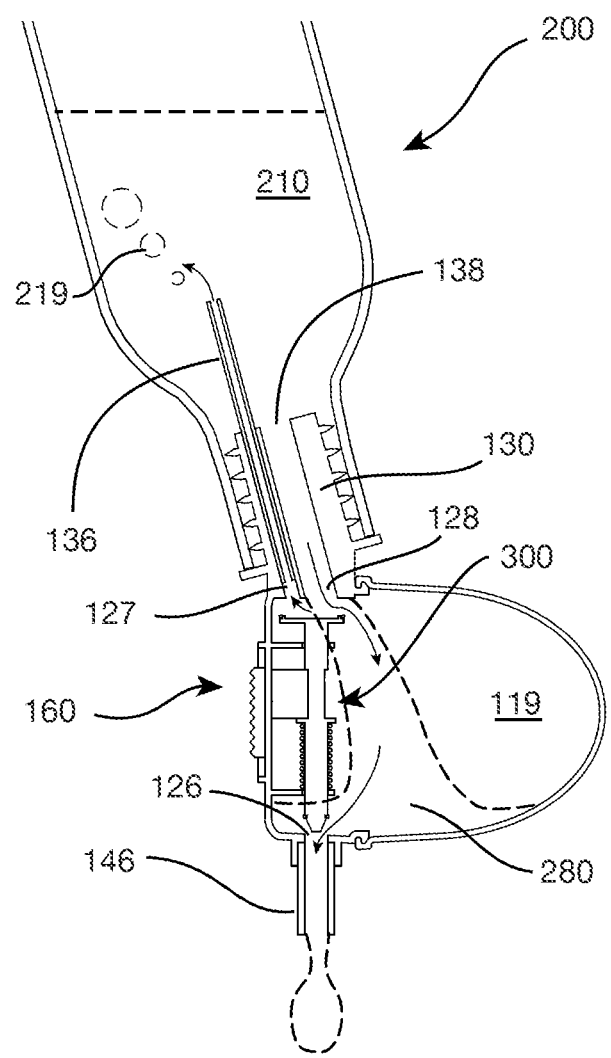

FIG. 10B shows actuator 160 in an intermediary position of FIG. 9B, with the primary reservoir 200 with fluid 210 is in fluid communication with the atmosphere through fluid outlet 126 and spout 146. This can be considered a 'continuous pour' position where fluid 210 can flow through the common volume 119 without being measured in the staging reservoir 110. In this position air return conduit 134 is open to common volume 119, and air can be exchanged therebetween as relative volumes change, for example by releasing bubbles 219 to replace the volume of fluid 210 that flowed into the common volume 119.

Figure 10C:
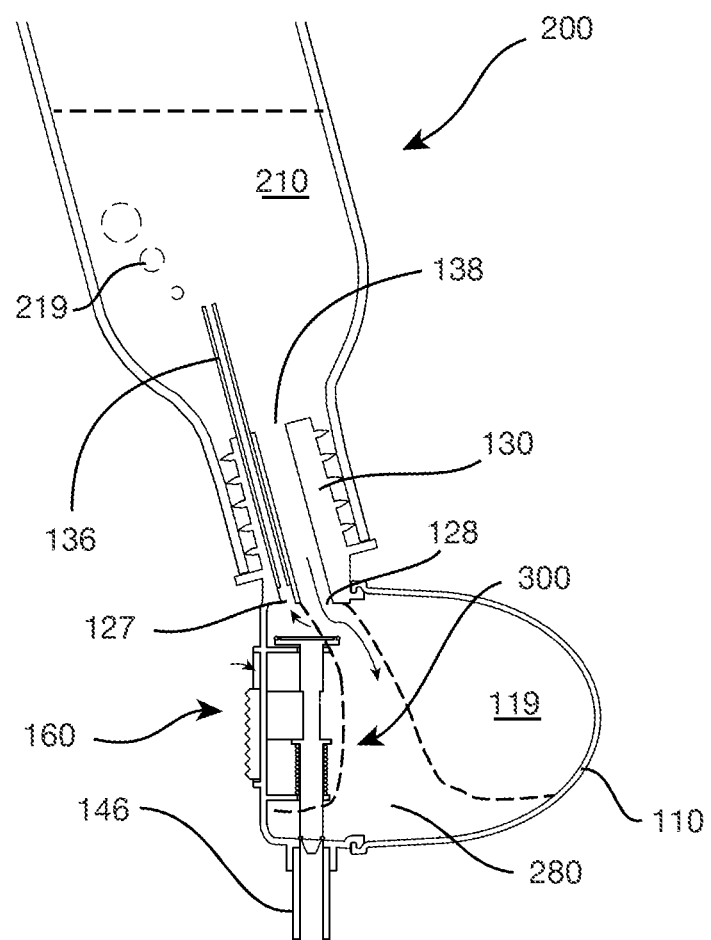

FIG. 10C shows the actuator in the sealing position shown in FIG. 9C, where fluid 210 can flow from the primary reservoir 200, through the fluid inlet 128, and into the common volume 119. In this position, valve assembly 300 seals off fluid outlet 126, allowing dispensed fluid 280 to collect in the common volume 119 and be measured. Once a desired volume of fluid is measured, the actuator can be released, returning to the default position, and fluid can be dispensed through the fluid outlet 126 and spout 146.

Figure 10D:
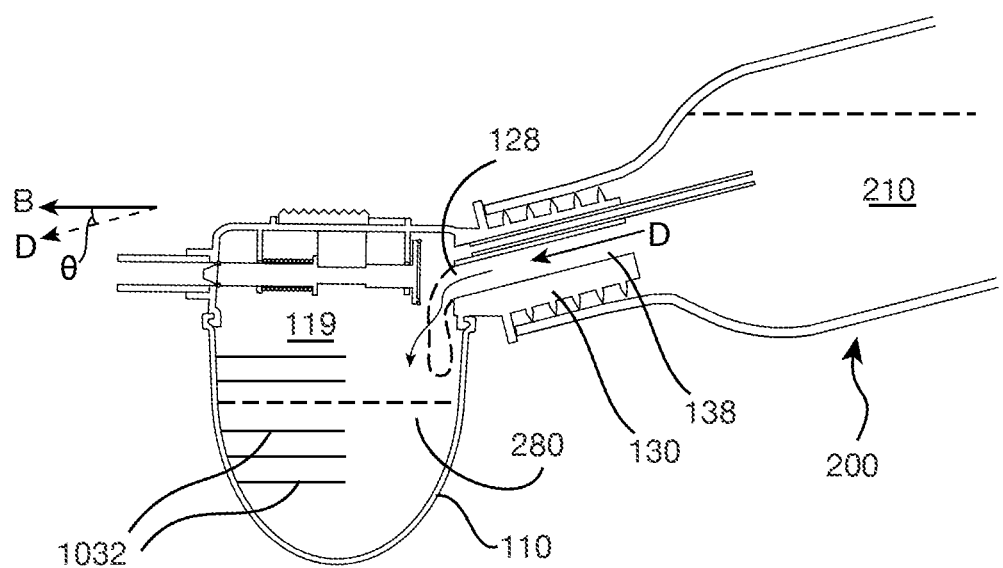

In FIG. 10D, the volume of dispensed fluid 280 is measured against graduation lines 1032 that run substantially parallel to direction B. To check measurements, a user rotates the device 100 until the direction B is substantially parallel to the ground for the dispensed liquid to settle along the graduation lines 1032. Once settled, the user can observe the level of the settled dispensed fluid 280 against the graduation lines 1032.

In some implementations, coupler 130 and fluid path 138 extend substantially along a direction D that is disposed at an angle θ to direction B. This angle θ holds the primary reservoir 200 at an elevated position when the device 100 is held such that direction B is substantially parallel to the ground as in FIG. 10D. This elevated position of the primary reservoir helps to pour an exact quantity more quickly, as dispensed fluid 280 can enter the common volume 119 and settle along the gradation lines 1032 without having to reposition the device 100. Having the coupler 130 disposed at an angle to direction B also helps to prevent pour backs, as the device would need to be rotated back an additional angle θ to flow back from the common volume 119 through the fluid path 138. In some implementations, the angle θ between directions B and D is approximately fifteen degrees. In other implementations the angle may be more or less than fifteen degrees based on the geometry of the primary reservoir 200, the viscosity of the intended fluid 210 to be dispensed, the geometry of the device 100, and other applicable factors.

Figure 10E:
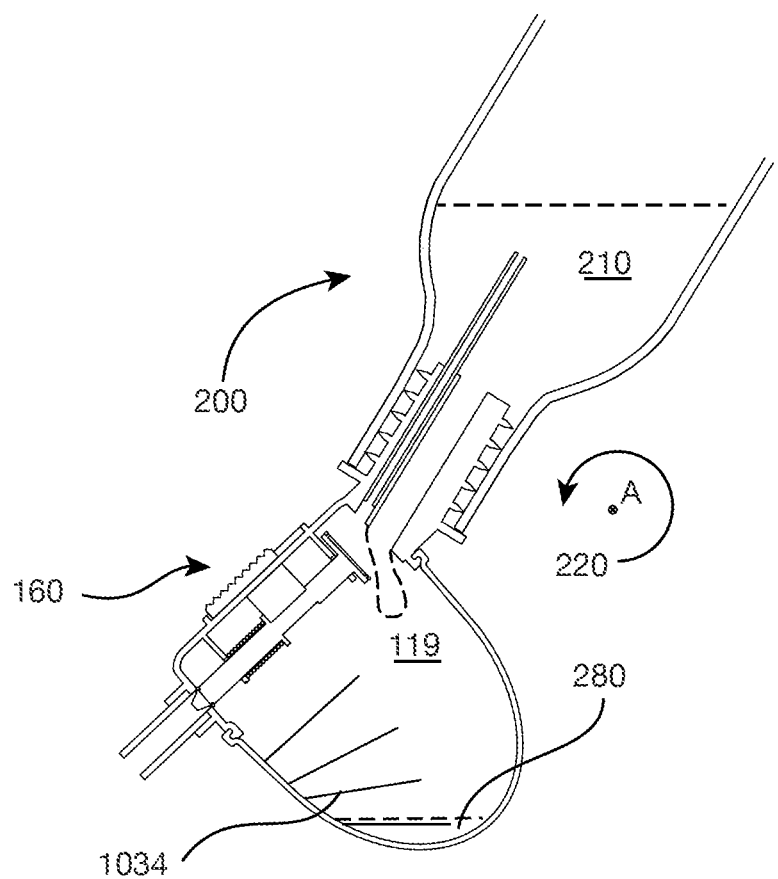

In FIG. 10E, the volume of dispensed fluid 280 is measured against graduation lines 1034 that are configured in a radial pattern with lines at different angles to one another. To check measurements, a user can maintain a pouring position steep, i.e. with direction B is pointing downward with respect to horizontal, while reading volume values, i.e. without having to return the device to the horizontal position of FIG. 10D. To fill to a specific volume, a user can tilt the device and attached primary reservoir to a pouring position where the desired radial measurement line is a horizontal position, and can stop flow of additional fluid into the common volume 119 by releasing the actuator 160, allowing the valve assembly 300 to seal off fluid path 138 through action of the biasing member 360 on the valve body 310 (as in FIG. 9A).

In some implementations, graduation lines 1032 and 1034 are at least partially translucent or the staging reservoir 110 is at least partially translucent to enable a user to determine the level of dispensed fluid 280 in common volume 119 against the lines.

In use, the primary reservoir, such as a bottle, is sitting in a typical upright position with the opening at the top (as in FIG. 5A), and the device is attached to the primary reservoir with the fluid flow path direction D (shown in FIG. 10D) generally pointed straight up (opposite the direction of gravity). In this storage position the fluid 210 within the primary reservoir 200 is below the coupler 130. In order to fill the primary volume 119 of the device 100 with fluid, the device 100 (and attached primary reservoir) must be pivoted about axis A in direction 220 to a staging position where that fluid 210 in primary reservoir 200 is above the coupler 130 so that it can flow into the fluid path 138 (such as in each of FIGS. 10A-10E). The device 100 must then be placed into a dispensing position where dispensed fluid 280 in the common volume 119 is above the fluid outlet 126 so that it can flow out of the common volume 119 through nozzle 146 (as in FIG. 10B or 10C, but not in FIG. 10D or 10E). Once the desired amount of fluid is dispensed from the primary reservoir 200 into the common volume 119, the actuator 160 can be released to seal off the fluid path 138 to prevent additional fluid flow therethrough whether the device is in a staging position or dispensing position.

Figure 12:
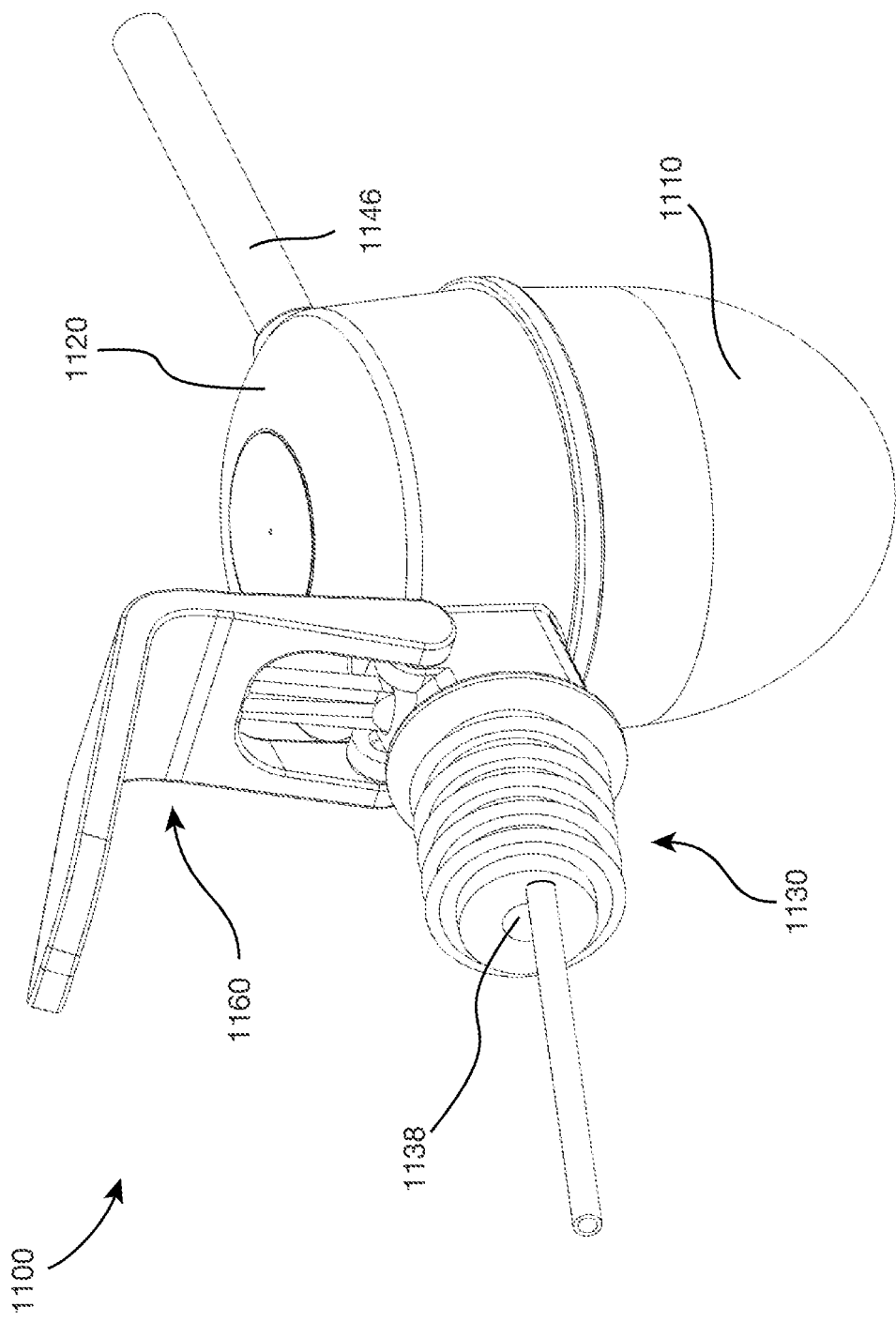
FIG. 12 depicts a rear isometric view of the fluid dispensing device of FIG. 11.

FIG. 11 shows a front isometric view of an alternative implementation of dispensing device 1100 with coupler 1130, control valve housing 1120, and staging reservoir 1110. Actuator 1160 is attached to the control valve housing 1120 and can be actuated to allow fluid to flow through dispensing path 1138 (as seen in FIG. 12), into staging reservoir 1110, and out of spout 1146. Control valve housing 1120 also has a housing air check valve 1124 on a top surface thereof to equalize pressure from within the common volume 1119 and the atmosphere. In some implementations, coupler 1130 includes an air relief conduit 1136 to equalize pressure between primary reservoir 200 and the common volume 1119 during a staging operation where fluid is flowing between the common volume 1119 and the primary reservoir 200. Air relief conduit 1136 can include a conduit air check valve at the primary-reservoir end thereof to prevent fluid from entering the air relief conduit during a pouring operation, while allowing air to flow from the conduit 7136 into the primary reservoir 200 (this conduit check valve is shown more clearly in some other implementations).

Figure 13:
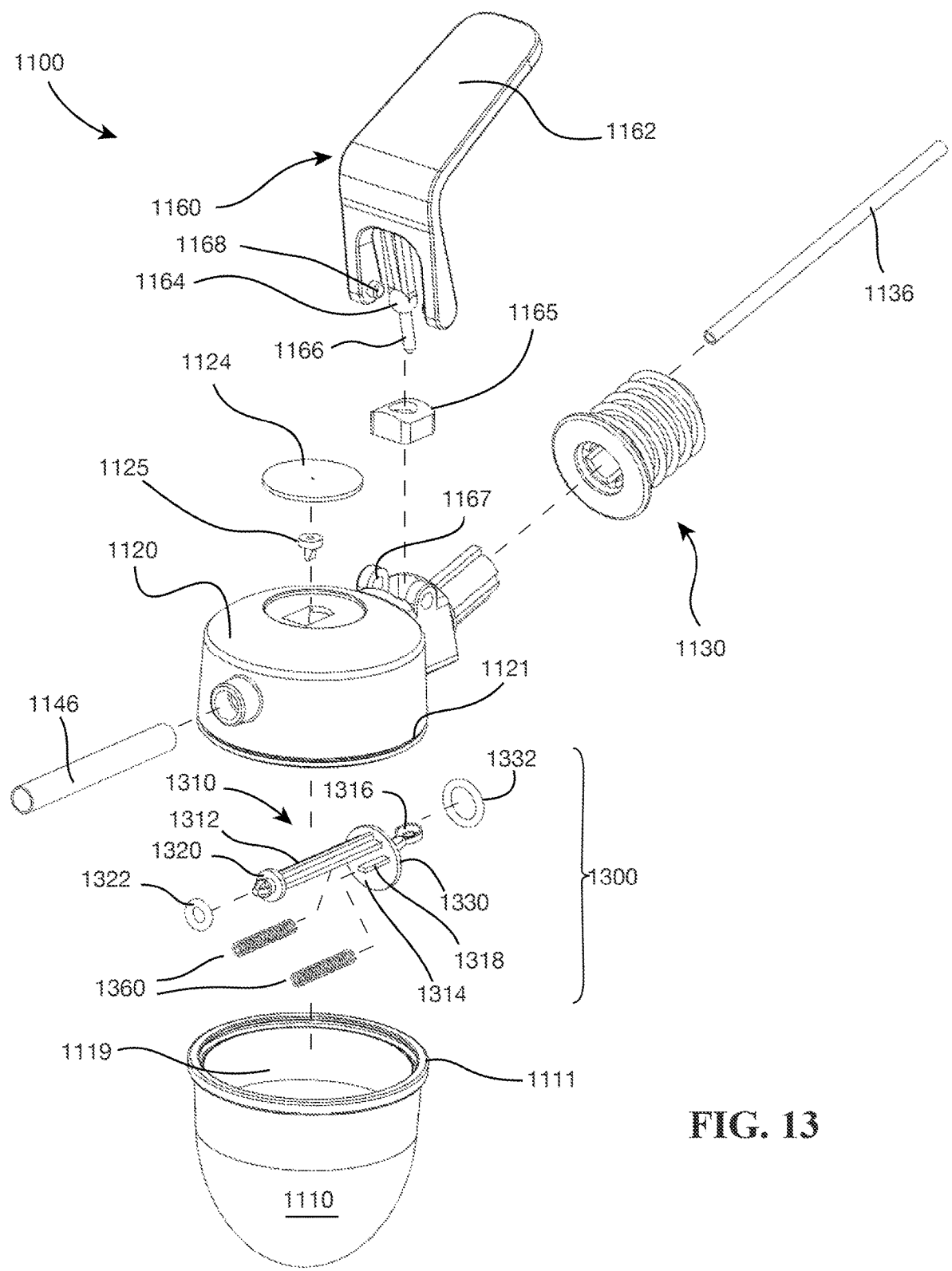
FIG. 13 depicts a top isometric exploded view of the fluid dispensing device of FIG. 11.

FIG. 13 shows an exploded view of the device 1100, revealing the control valve assembly 1300 that cooperates with actuator 1160 to open and close access to and from the control valve housing 1120. Actuator 1160 includes protrusions 1168 that cooperate with openings 1167 to allow the actuator 1160 to pivot about axis 1161 (shown in FIG. 16B), which also pivots post 1164 to actuate securing interface 1166 (describes more fully below with respect to FIG. 14). Control valve assembly 1300 includes a control valve body 1310 having main shaft 1312, collar 1314, and actuator interface 1316. One or more biasing members 1360 is positioned over the post 1318 until it abuts collar 1314. Control valve body 1310 also includes an outlet seal seat 1320 and an inlet seal seat 1330. In some implementations, outlet seal seat 1320 and inlet seal seat 1330 may further include outlet seal 1322 and inlet seal 1332, respectively, each of which can be substantially surrounding the periphery of the outlet seal seat 1320 and the inlet seal seat 1330, respectively.

FIG. 13 further shows the staging reservoir 1110 below control valve housing 1120.

Staging reservoir 1110 is removably attached to the control valve housing 1120 via a staging reservoir securing surface 1111 that cooperates with a valve housing securing surface 1121 to create a seal between the control valve housing 1120 and the staging reservoir 1110. In some implementations, each of the securing surfaces 1111 and 1121 substantially surround the periphery of each of the staging reservoir and control valve housing, respectively, to create a common volume 1119 therebetween (see FIG. 15). FIG. 13 also shows air check valve 1124 in more detail, with duck bill valve 1125 being secured to control valve housing 1120 to allow air into the common volume 1119 without allowing air or fluid to flow out of air check valve 1124.

Figure 14:
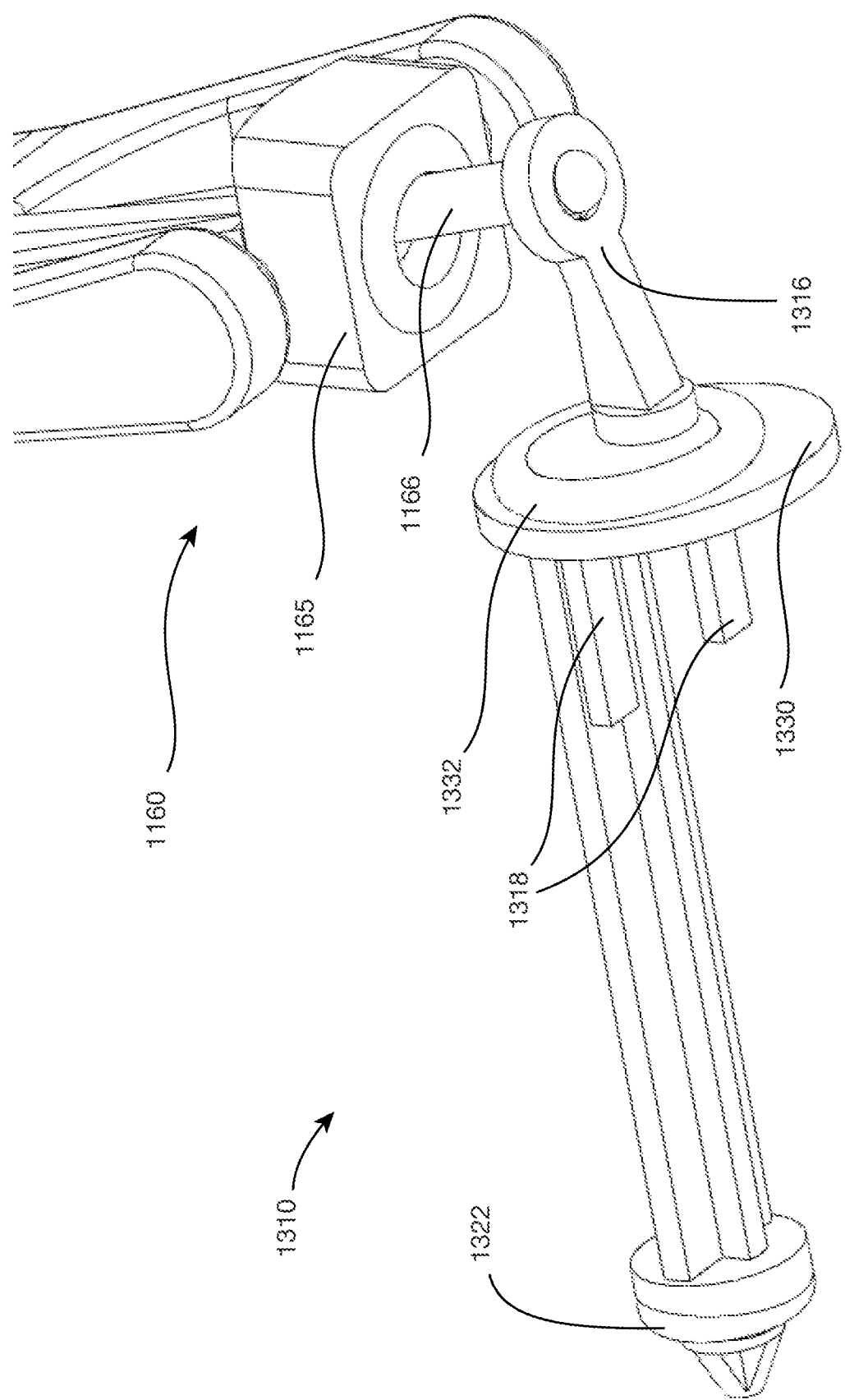
FIG. 14 depicts a detail view of an actuator mechanism and valve body of the fluid dispensing device of FIG. 11.

FIG. 14 provides a close up of the actuator 1160 and valve body 1310 (with seals 1322 and 1332). Actuator 1160 includes on a top side thereof a user engagement portion 1162 that a user engages to operate the device 1100. One or more posts 1164 extend from a bottom side of the actuator 1160, and include a securing interface 1166. In the example implementation of FIG. 14, the securing interface 1166 is formed as a post that extends through a bearing block 1165. Bearing block 1165 provides complementary geometry to post 1164 to act as a pivot point or fulcrum against which the post 1164 and attached securing interface 1166 can pivot. The securing interface 1166 cooperates with the actuator interface 1316 of the valve body 1310 to transfer movement of the user engagement portion 1162 to the control body 1310 in order to seal and unseal various apertures extending through the control valve housing 1120, described more fully below.

Figure 15:
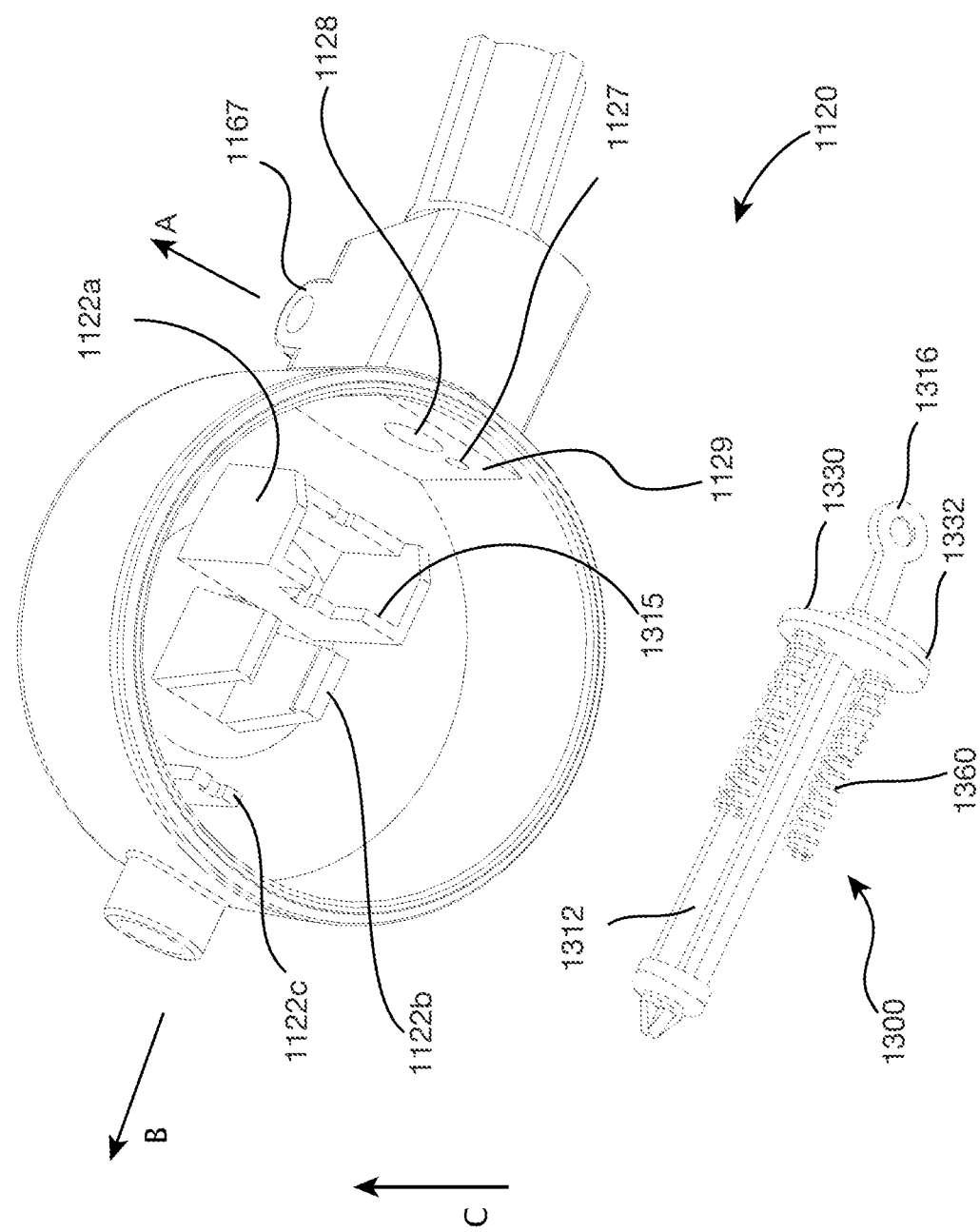
FIG. 15 depicts a detail view of the valve housing and valve body of the fluid dispensing device of FIG. 11.

FIG. 15 shows the underside of valve housing 1120 with various valve guides 1122a, 1122b, and 1122c extending therefrom. Shaft 1312 is configured to engage the valve guides 1122a, 1122b, and 1122c such that the shaft 1312 is constrained from vertical movement along the positive C direction while allowing the shaft to slide freely along the B direction. For example, valve guide 1122a is shaped to support the shaft 1312 of the valve body 1310 from moving in the C direction and well as the A direction. Valve guide 1122a also provides a bearing surface 1315 against which biasing members 1360 can press. Valve guide 1122b engages the profile of shaft 1312 to prevent movement of the shaft 1312 against movement in the negative C direction. Valve guide 1122b is formed as a pair of clips that spread out to accommodate and snap around the shaft 1312. Valve guide 1122c is provided as a single guide surface shaped to prevent motion of the shaft in the positive C direction as well as in the A direction while allowing the shaft 1312 to be able to move along the B direction.

To install the valve assembly 1300 to the valve housing 1120, the actuator interface 1316 of the valve body 1310 is inserted into the fluid inlet 1128, aligned with the valve guides 1122a-1122c, and snapped into place with the prongs of valve guide 1122b. Biasing members 1360 are compressed onto the posts 1318 and released to push against bearing surface 1315 once the shaft 1312 is secured. Once secured, the valve assembly is biased toward sealing surface 1129 by the biasing members 1360, causing the seal 1332 on inlet seal seat 1330 to be pressed against sealing surface 1129, closing off fluid communication between fluid inlet 1128 and air relief aperture 1127 and the common volume 1119. This is the default position.

Figure 16B:
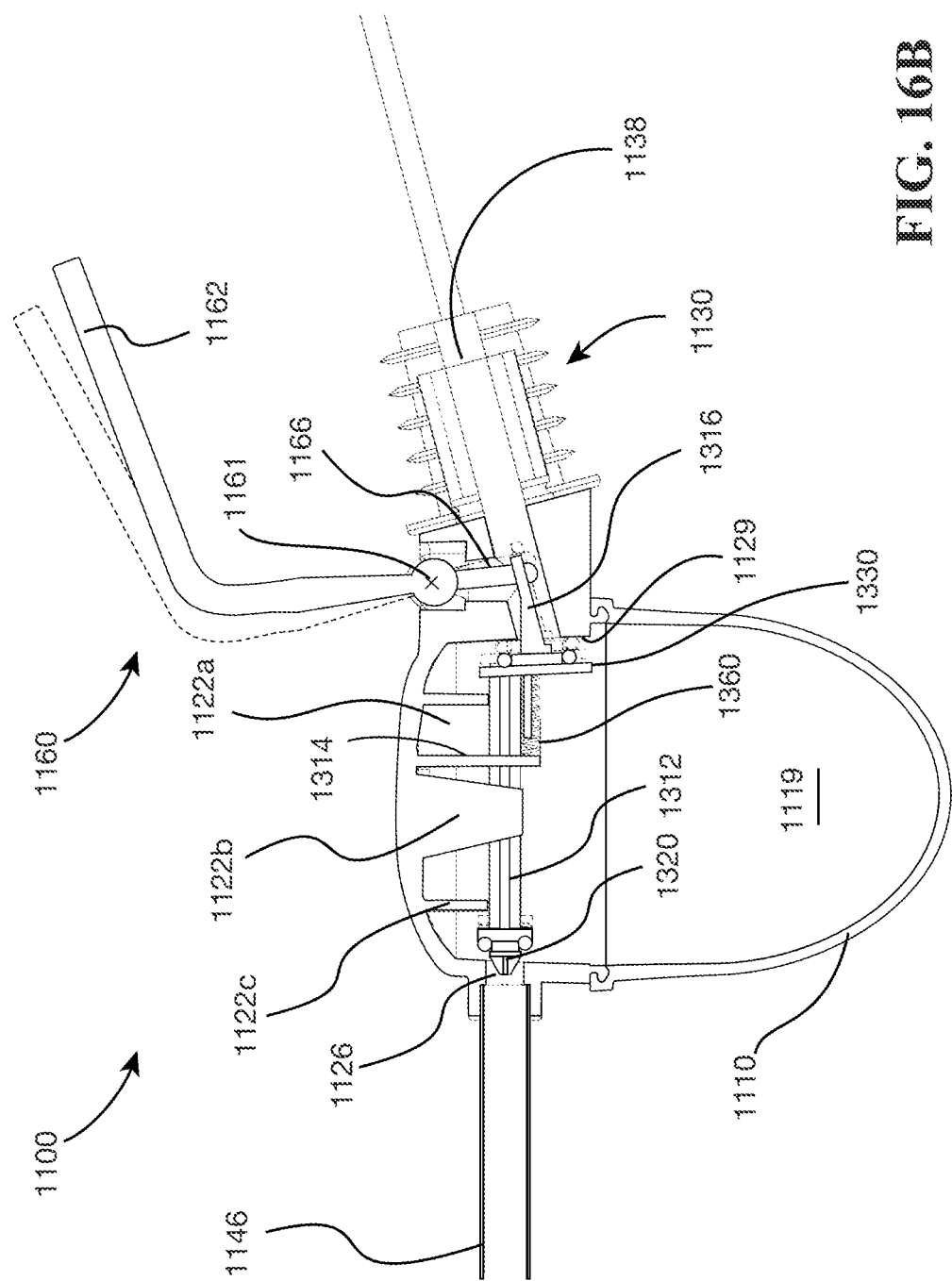

FIG. 16A-16C provide cross-sectional views of the device with the actuator 1160 in three different positions. In FIG. 16A, device 1100 is in its default position, with biasing member 1360 pushing valve body 1310 toward the coupler 1130. In this position, inlet seal seat 1330 is pressed against the inlet sealing surface 1129 of the valve housing 1120, causing the seal 1332 to seal off apertures 1127 and 1128 from common volume 1119.

In FIG. 16B, actuator 1160 is in an intermediate position where valve assembly 1300 is moved against a biasing force of the biasing member 1360 towards the spout 1146 without blocking fluid outlet 1126. In this position inlet seal seat 1330 is moved away from the inlet sealing surface 1129, allowing fluid and air to be exchangeable through apertures 1128 and 1127, respectively, between the common volume 1119 and an attached primary reservoir 200, for example.

In FIG. 16C, the actuator is in an outlet sealing position, where outlet seal seat 1320 blocks the fluid outlet 1126, preventing fluid flow out of spout 1146. In the outlet sealing position, valve assembly 1300 remains apart from inlet sealing surface 1129, keeping the apertures 1128 and 1127 open and in fluid communication with the common volume 1119.

Device 100 may be configured such that actuator 1160 may, in a one-hand operation, be operated while also holding and manipulating device 1100 and an attached primary reservoir 200. In some implementations, device 1100 may be configured to be grasped between a thumb and fingers of a hand, with the thumb engaging the user engagement portion 1162 of actuator 1160. The device is operated by pressing against the user engagement portion 1162 to with the user's thumb while the fingers and palm of the same hand may at least partially grasp and/or provide support for an attached primary reservoir. This causes the actuator 1160 to pivot about a pivot joint 1161, pushing the inlet seal seat 1330 away from the sealing surface 1129, and opening the fluid inlet 1128 and air relief aperture 1127 to common volume 1119. The device can then be used as in the previous example implementation. This includes pivoting the device about a direction A to cause fluid from an attached primary reservoir to flow into the common volume 1119.

When the actuator 1160 is in the intermediate position as in FIG. 16B, fluid can flow continuously and uninterrupted from the fluid inlet 1128 and out of the fluid outlet 1126. When the actuator 1160 is in a sealing position as in FIG. 16C, fluid can flow into common volume 1119 but cannot flow out of the fluid outlet 1126 and spout 1146. When in the sealing position the common volume 1119 can be filled with fluid 210 without concern of dispensing said fluid before it can be measured. This allows for faster measuring as the primary reservoir 200 and device 1000 can be rotated fully (e.g., to a dispensing position) to allow for fluid to flow more rapidly into the common volume 1119. Progress as to volume dispensed into the common volume 1119 can be checked staging reservoir 1110.

Figure 19:
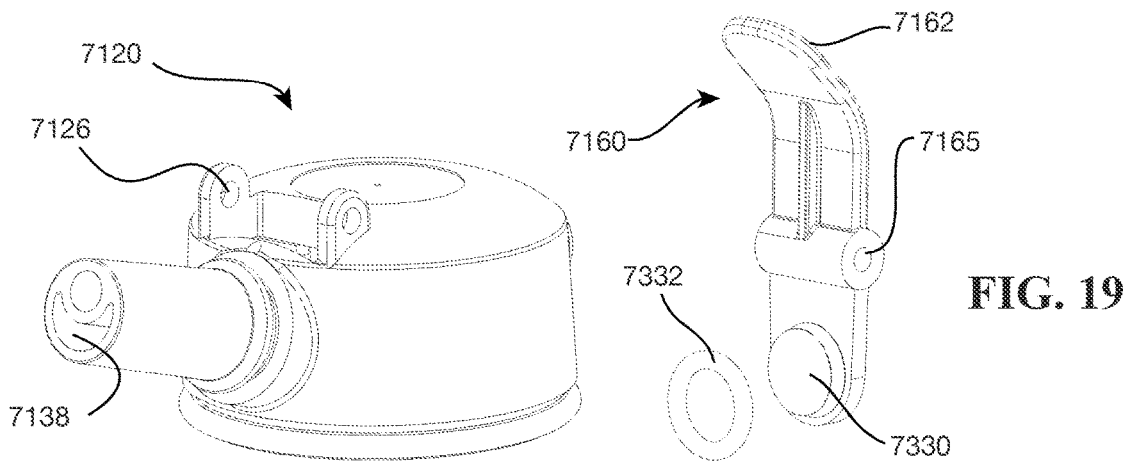
FIG. 19 depicts a rear isometric view of a valve housing, actuator, and sealing member of the fluid dispensing device of FIG. 17.

FIG. 17 shows a front isometric view of another alternative implementation of the dispensing device 7100, with coupler 7130, control valve housing 7120, and staging reservoir 7110. Actuator 7160 is attached to the control valve housing 7120 and can be actuated to allow fluid to flow through dispensing path 7138 (as seen in FIG. 19), into staging reservoir 7110, and out of spout 7146. Control valve housing 7120 also has a housing air check valve 7124 on a top surface thereof to equalize pressure from within the common volume 7119 and the atmosphere. In some implementations, coupler 7130 includes an air relief conduit 7136 to equalize pressure between the primary reservoir 200 and the common volume during a staging operation where fluid is flowing between the common volume 7119 and the primary reservoir 200. Air relief conduit 7136 can include a conduit air check valve 7134 at the primary-reservoir end thereof to prevent fluid from entering the air relief conduit during a pouring operation, while allowing air to flow from the conduit 7136 into the primary reservoir 200.

Figure 18:
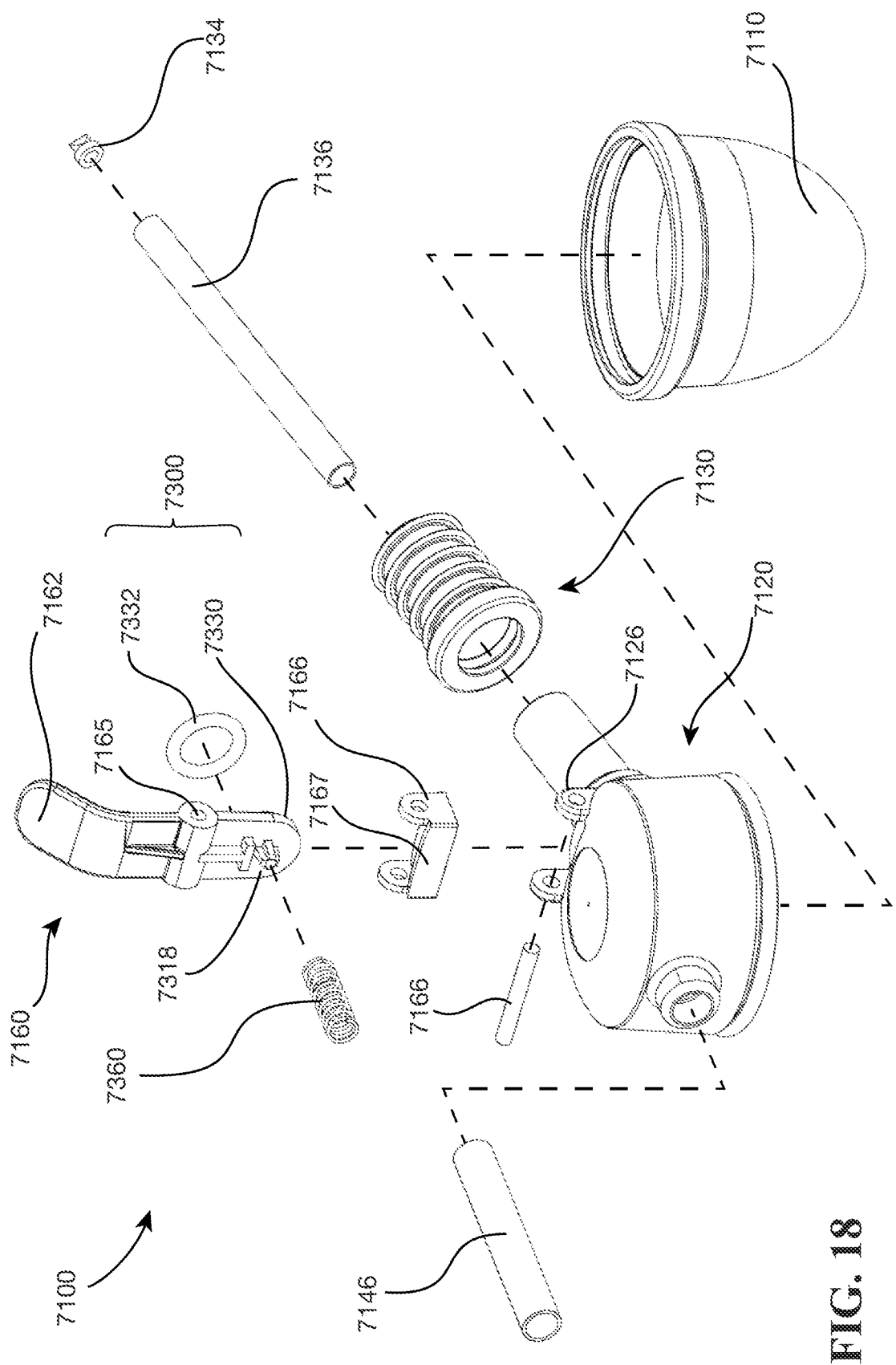
FIG. 18 depicts a top isometric exploded view of the fluid dispensing device of FIG. 17.

FIG. 18 shows an exploded view of the device 7100, revealing the control valve assembly 7300 that cooperates with actuator 7160 to open and close access to and from the control valve housing 7120. Control valve assembly 7300 includes an inlet seal seat 7330, a post 7318, and a biasing member 7360 positioned over post 7318. In some implementations, inlet seal seat 7330 may further include an inlet seal 7332 secured to the inlet seal seat 7330, inlet seal 7332 sized and shaped to provide a seal around both the fluid inlet 7128 and air relief aperture 7127 when the inlet seal seat 7330 is biased to the default position of FIG. 21A.

FIG. 18 further shows the staging reservoir 7110 below control valve housing 7120.

Coupler 7130, air relief conduit 7136 (and in some implementations a conduit check valve 7134), and spout 7146 connect to the housing 7120.

FIG. 19 provides an exploded view of the control valve housing 7120, the actuator 7160, and inlet seal seat 7330 (with seals 7332 in some implementations). Actuator 7160 includes on a top side thereof a user engagement portion 7162 that a user engages to operate the device 7100. The pivot points 7165 of the actuator 7160 cooperate with pivot points 7126 of the housing 7120 to transfer movement of the user engagement portion 7162 to the inlet seal seat 7330 in order to seal and unseal the fluid inlet 7128 and air relief aperture 7127, described more fully below.

Figure 20A:
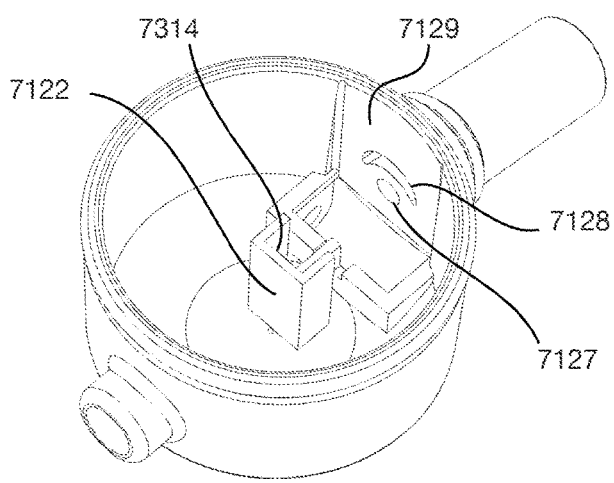
FIGS. 20A and 20B depict bottom isometric views of a valve housing with and without the actuator and sealing member of FIG. 19 installed.

FIG. 20A shows the underside of valve housing 7120 with valve guide 7122 extending therefrom. Valve guide 7122 in this implementation provides a bearing surface 7314 for the biasing member 7360 to engage to apply a biasing force upon the inlet seat seal 7330 to cause the actuator to be biased into a default position as seen in FIG. 21A.

Figure 20B:
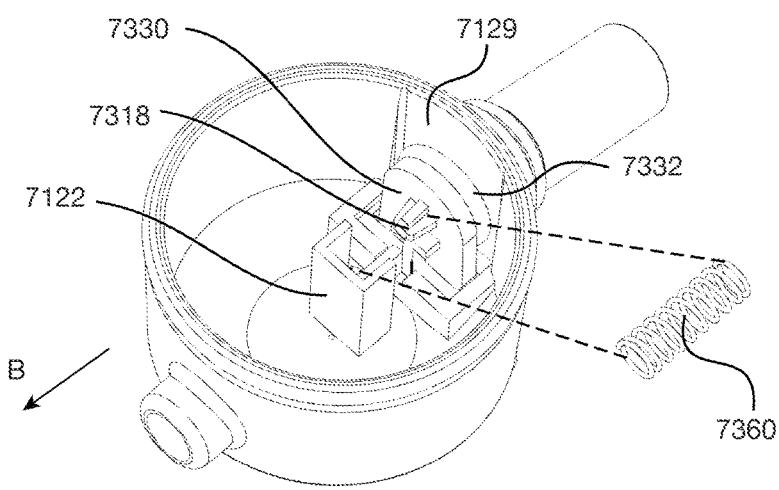

During assembly, control valve inlet seal seat 7330 is inserted through bearing block 7167 and into control valve housing 7120 such that pivot points 7165/7166/7126 of the actuator 7160, bearing block 7167, and housing 7120, respectively, all line up so that a common shaft 7166 can be inserted therethrough and constrain the movement of the actuator 7160 to rotation about the shaft 7166. In some implementations, bearing block 7167 is a separate part that may be made of alternate materials from the housing body 7120 (such as a low friction polymer or metal material), or have complex geometries that would be difficult to manufacture as part of housing 7120. In some implementations, bearing block 7167 is formed integrally with valve housing 7120. The biasing member 7360 is placed over the post 7318 and compressed to fit against bearing surface 7314 (shown in FIG. 20B).

Figure 21A:
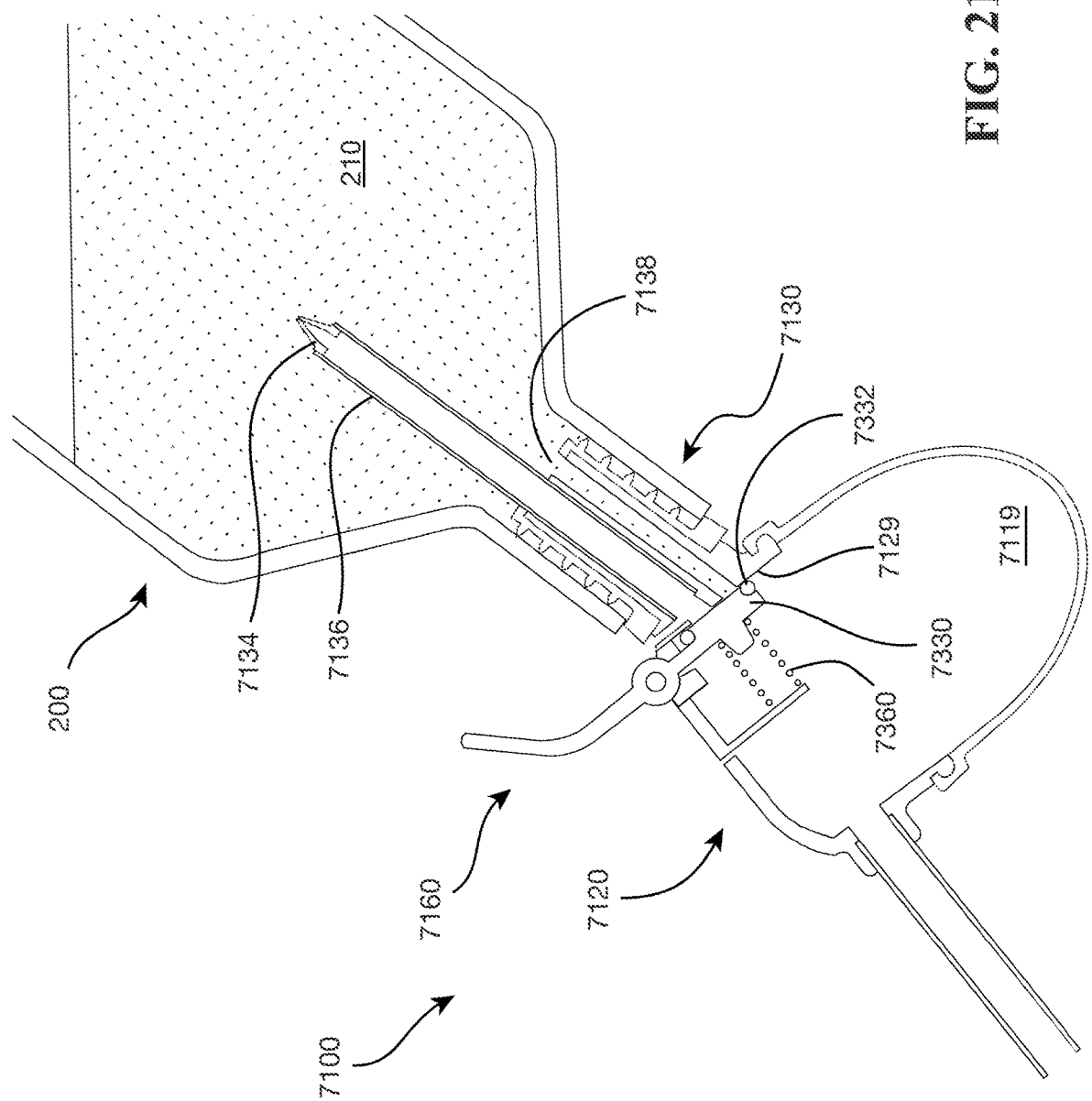
FIGS. 21A and 21B depict cross-sectional views of the fluid dispensing device of FIG. 17 with an actuator in different positions.
Figure 21B:
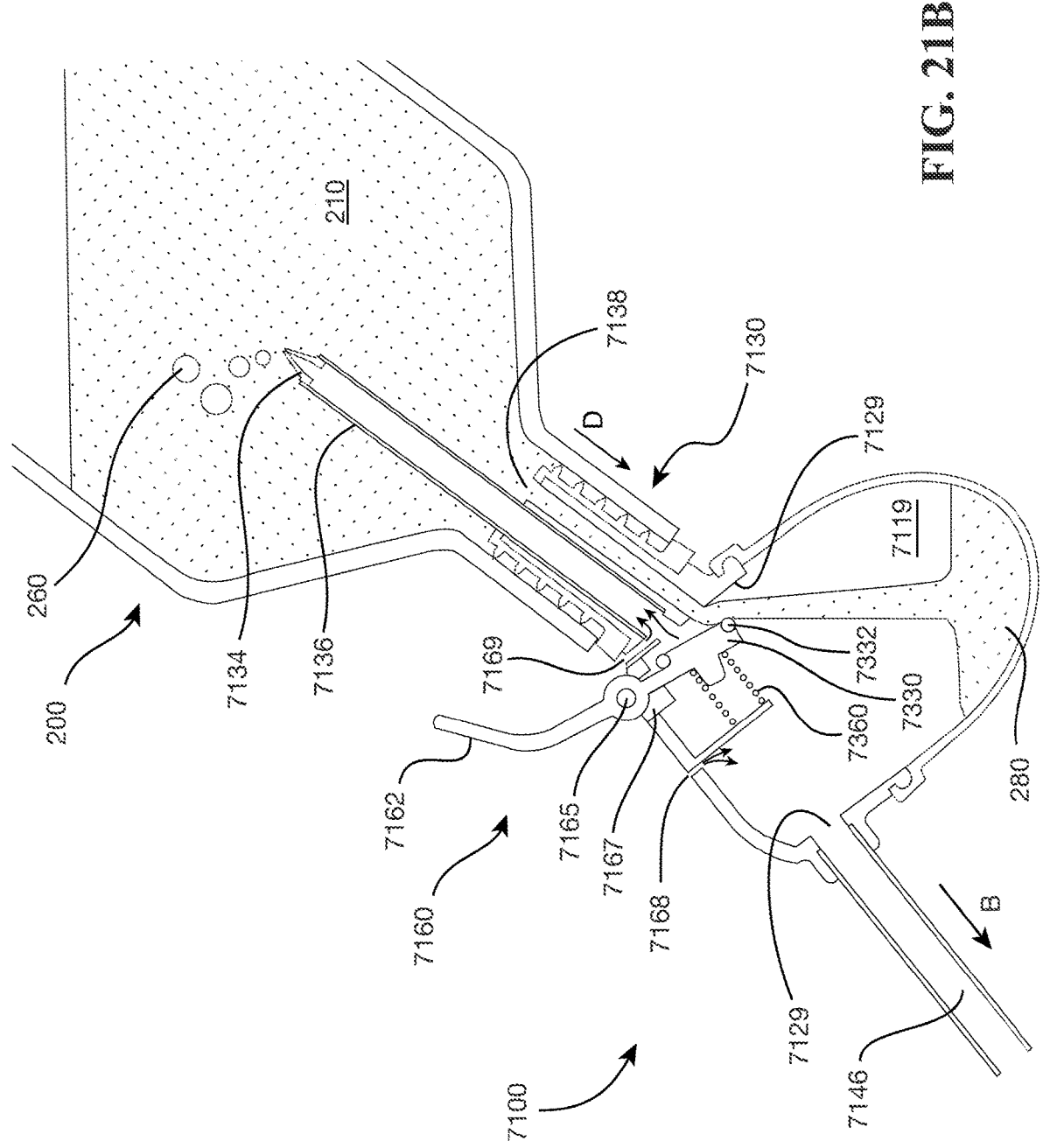

FIGS. 21A and 21B provide cross-sectional views of the device 7100 with the actuator 7160 in two different positions. In FIG. 21A, device 7100 is in its default position, with biasing member 7360 pushing the inlet seal seat 7330 toward the coupler 7130. In this position, inlet seal seat 7330 is pressed against the inlet sealing surface 7129 of the valve housing 7120. While fluid 210 enters the fluid dispensing path 7138 when the bottle is tilted to a dispensing position, it is sealed off from entering the common volume 7119 by inlet seal 7332. In some implementations, conduit check valve 7134 on air relief conduit 7136 (similar to the check valves discussed in more detail with respect to FIGS. 6, 7A and 7B) prevents fluid 210 in primary reservoir 200 from entering the air relief conduit 7136.

In FIG. 21B, actuator 7160 is in an open position. When the user engagement portion 7162 of actuator 7160 is engaged to pivot the actuator 7160 about pivot point 7165, inlet seal seat 7330 is moved against a biasing force of the biasing member 7360 towards the spout 7146. In this position, inlet seal 7332 is moved away from the inlet sealing surface 7129, allowing fluid and air to be exchangeable through apertures 7128 and 7127, respectively, between the common volume 7119 and an attached primary reservoir 200. In some implementations, air can also enter the air relief conduit 7136 through a connector air relief aperture 7169. In some implementations, air can enter the common volume 7119 through housing air relief aperture 7168, and can flow through aperture 7127 and into air relief conduit 7136. Check valve 7134 prevents fluid 210 from entering the air relief conduit 7136, but allows air 260 to be released into the primary reservoir 200 to displace the dispensed fluid 280 that has entered the common volume 7119. Fluid 210 can flow into the common volume 7119 to be measured before dispensing, or can be poured directly out of the spout 7146 through fluid outlet 7129 to dispense without measuring. Note also that in some implementations, the coupler 7130 and flow path 7138 extend along a direction D that is at an angle to direction B, such as the angle θ described in reference to FIG. 10D.

Figure 22B:
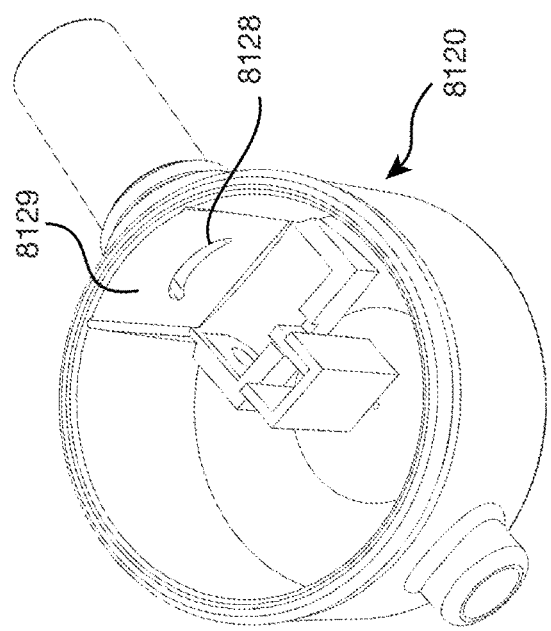
FIG. 22B depicts a bottom isometric view of the housing of the fluid dispensing device of FIG. 22A.
Figure 22A:
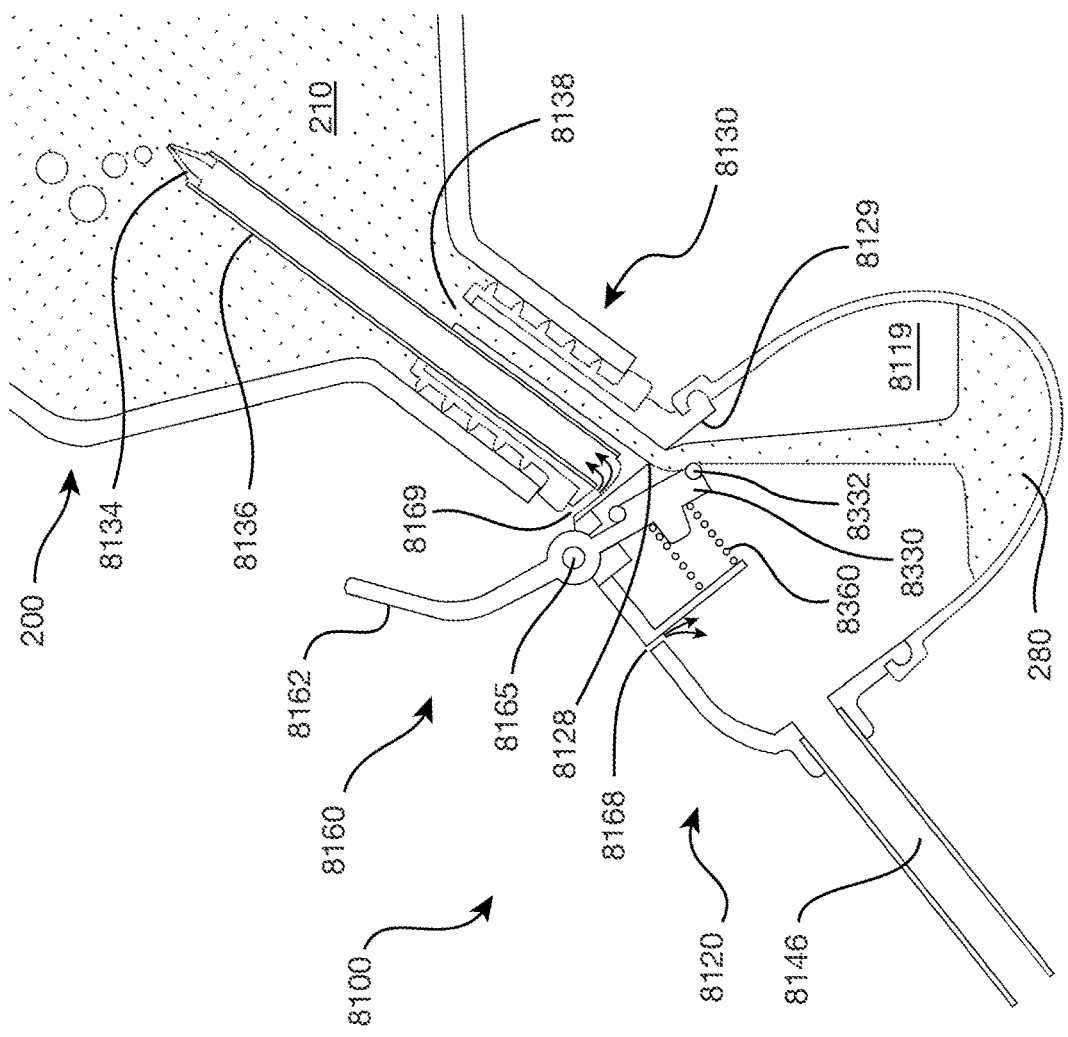
FIG. 22A depicts a cross-sectional view of another example implementation of a fluid dispensing device.

FIG. 22A shows a cross-sectional view of another alternative implementation of the dispensing device 8100. This device is substantially similar to the dispensing device 7100 of FIGS. 17-21B, but eliminates the aperture 7127. This prevents fluid dispensed through fluid path 8138 and fluid inlet 8128 in coupler 8130 from flowing into the air relief conduit 8136. FIG. 22B shows an isometric view of the underside of housing 8120, with only fluid inlet 8128 passing through inlet sealing surface 8129. As seen in FIG. 22A, when the user engagement portion 8162 of actuator 8160 is engaged to pivot the actuator 8160 about pivot point 8165, inlet seal seat 8330 is moved against a biasing force of the biasing member 8360 towards the spout 8146. In this position, inlet seal 8332 is moved away from the inlet sealing surface 8129, allowing fluid to be exchangeable through apertures 8128 between the common volume 8119 and an attached primary reservoir 200. In this implementation, air enters the air relief conduit 8136 through a connector air relief aperture 8169, but does not exchange air from within the common volume 8119 when fluid 200 is being dispensed through fluid inlet 8128. Check valve 8134 prevents fluid 210 from entering the air relief conduit 8136, but allows air to be released into the primary reservoir 200 to displace the dispensed fluid 280 that has entered the common volume 8119. Air can be exchanged with the common volume 8119 through housing air relief aperture 8168 and the spout 8146 (when no dispensed fluid 280 is being poured therefrom) to compensate for displacement by dispensed fluid 280.

FIG. 23A shows a cross-sectional view of another alternative implementation of the dispensing device 9100. This device is substantially similar to the dispensing device 8100 of FIGS. 22A & 22B, but further eliminates the air relief aperture 8169 as well as the air relief conduit 8136 and the corresponding geometry in the coupler 7130. This allows for a fluid path 9138 and fluid inlet 9128 to occupy substantially more volume within the coupler 9130, thereby increasing the flow rate and amount of fluid 210 that can flow from the primary reservoir 200 into the device 9100. FIG. 23B shows an isometric view of the underside of housing 9120, with only fluid inlet 9128 passing through inlet sealing surface 9129. As seen in FIG. 23A, when the actuator 9160 is engaged to pivot the actuator 9160 about pivot point 9165, inlet seal seat 9330 is moved against a biasing force of the biasing member 9360. In this position, inlet seal 9332 is moved away from the inlet sealing surface 9129, allowing fluid to be exchangeable through apertures 9128 between the common volume 9119 and an attached primary reservoir 200. In this implementation, inlet seal 9332 is formed as a solid piece that covers the entire aperture 9128 when in a closed position (analogous to other implementations described above).

As seen in FIGS. 10A-10E, in some implementations, dispensing device 100 is configured such that a flow of fluid from an attached primary reservoir 200 to staging reservoir 110 via fluid flow path 138 may be generated by sufficiently elevating an attached primary reservoir 200 relative to staging reservoir 110, such as by rotating the device 100 and primary reservoir 200 about axis A in direction 220 (as shown in FIG. 1). An elevation, or in other words an orientation, which generates a flow of fluid 210 from an attached primary reservoir 200 to staging reservoir 110 via fluid flow path 138 while not exceeding a maximum staging elevation can be called a fluid staging orientation, and a range of such fluid staging orientations may be possible from a higher degree of sufficient elevation to a lower degree of sufficient elevation. In some implementations, when exceeding the maximum staging elevation, fluid may flow from staging reservoir 110 via fluid outlet 126. As the common volume 119 fills up with dispensed liquid, the device 100 and primary reservoir 200 can be rotated about axis A in direction 230 (shown in FIG. 1) to avoid flowing out of fluid outlet 126. Alternatively, actuator 160 can be fully engaged to the position of FIG. 9C where fluid outlet 126 Once a desired volume of fluid is disposed in staging reservoir 110, actuator 160 can be released to place the device in the default position.

A fluid pouring orientation is one of a range of orientations, wherein staging reservoir 110 is rotated sufficiently for staging reservoir outlet 126 to be sufficiently lower in elevation than fluid staged in staging reservoir 110 such that the fluid pours from and drains from staging reservoir 110.

It should be appreciated that the coupler 130 the (as well as couplers of other implementations) is alternatively formed as a separate piece from the housing 120, and is intended to be "modular" so that a different sized couplers (with a larger or smaller outer diameter) could be interchanged with other sizes. This provides convenience to the user to not need to have different sized complete products for different sized bottles. The user need only change the removable coupler piece to adapt the product for use between bottles with widely different dimensions.

The various structures and components in the example implementations described herein can be manufactured and assembled using various materials, such as plastics and metals, using various manufacturing methods, such as injection molding plastics, stamping and forming metals, and the like. For example, the control valve may possibly be manufactured using plastics and injection molding methods and the spring may be possibly formed from a spring grade steel. Where structures may be permanently connected, they can be glued, welded (e.g., sonically welded plastics), configured with corresponding mating threads and screwed together, compression fitted, formed and produced as one piece, and the like and combinations thereof. Staging reservoir 110 can be manufactured using materials which facilitate observation and measurement of a volume of fluid staged therein, such as a transparent or translucent plastic material. Or, in other possible implementations, staging reservoir 110 can be manufactured using a stainless-steel material and comprise a transparent or translucent window configured to facilitate observation and measurement of a volume of fluid staged therein. In some implementations, the non-moving parts of dispensing device 100 can be formed from a mold in two separate part and mated together.

A number of implementations of the fluid dispensing device have been described. Various modifications may be made without departing from the spirit and scope of the disclosed fluid dispensing device.

The present disclosure is not to be limited in terms of the particular implementations described in this application, which are intended as illustrations of various aspects. Moreover, the various disclosed implementations can be interchangeably used with each other, unless otherwise noted. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations of the dispensing device have been described. Various modifications may be made without departing from the spirit and scope of the disclosure.

What is claimed is:

1. A device for dispensing fluids, the device comprising:
a control valve housing having a valve housing securing surface substantially surrounding the periphery of the control valve housing;
a staging reservoir having a staging reservoir securing surface substantially surrounding the periphery of the staging reservoir, wherein the staging reservoir securing surface cooperates with the valve housing securing surface to create a seal between the control valve housing and the staging reservoir and to define a common volume therebetween;
a coupler to secure the device to a primary reservoir, wherein the coupler defines a fluid flow path through which fluid may flow from the primary reservoir to the common volume through a fluid inlet when the coupler is attached to the primary reservoir;
a valve assembly comprising:
a control valve body having an inlet sealing surface configured to selectively seal off the fluid inlet; and
a biasing member configured to act on the control valve body to bias the inlet sealing surface toward the coupler to seal off the fluid inlet, preventing exchange of fluid between the device and the primary reservoir;
an actuator to move the control valve body away from the coupler against the action of the biasing member; and
an outlet for dispensing a fluid contained in the common volume;
wherein the seal between the securing surfaces of the control valve housing and staging reservoir is substantially circular, which circle defines a plane wherein the outlet and fluid inlet are on one side of the plane, and the majority of the common volume is on the other side of that plane.

2. The device of claim 1, wherein the actuator rotates about a pivot axis to actuate the control valve body.

3. The device of claim 1, wherein the actuator slides linearly to actuate the control valve body.

4. The device of claim 1, wherein the control valve body further includes an outlet sealing surface, whereby when the actuator is moved to an outlet sealing position the outlet sealing surface impedes fluid flow through the outlet.

5. The device of claim 1, wherein staging reservoir includes graduation lines for measuring a volume of fluid held therein.

6. The device of claim 1, wherein the coupler includes threaded interface to thread onto a primary reservoir with corresponding threads.

7. The device of claim 1, wherein the coupler includes an elastic interface to engage a primary reservoir with a friction fit.

8. The device of claim 1, wherein the coupler further includes an air return opening to allow air into the primary reservoir.

9. The device of claim 8, wherein the device further comprises a check valve connected to the air return opening to allow air into the primary reservoir through the air return opening while preventing fluid from exiting the primary reservoir through the air return opening.

10. The device of claim 9, wherein the check valve comprises:
a check valve housing configured to receive air from the air return opening via an air conduit;
a movable seal disposed within the check valve housing;
a check valve seat in the check valve housing between the air conduit and the movable seal; and one or more check valve outlets, wherein air coming through the air conduit toward the check valve pushes the movable seal away from the check valve seat and flows out of the check valve housing through the one or more check valve outlets, and wherein fluid coming through the one or more check valve outlets pushes the movable seal against the check valve seat, preventing fluid from entering the air conduit.

11. The device of claim 9, wherein the check valve is a duckbill valve configured to receive air from the air return opening via an air conduit.

12. The device of claim 1, wherein the device is rotatable from a storage position where fluid within the primary reservoir is below the coupler, to a staging position where fluid within the primary reservoir is above the coupler, and whereby when the device is in a staging position the actuator must be engaged to move the control valve body away from the coupler to an open position to allow a desired amount of fluid to be dispensed from the primary reservoir to the common volume, and released when the desired amount of fluid is dispensed to seal off the fluid inlet.

13. A metering device for measuring and dispensing fluid from a primary reservoir, the device comprising:
  a valve housing having a coupler configured to releasably connect to the primary reservoir;
  a staging reservoir in fluid communication with the coupler, the staging reservoir defining a primary volume for receiving the fluid from the coupler;
  a control valve disposed between the coupler and the staging reservoir, the control valve operable between an open position that allows fluid to flow between the coupler and the primary volume, and a closed position to prevent fluid from flowing between the coupler and the primary volume; and
  a fluid outlet on said valve housing for dispensing a volume of fluid from the primary volume;
  wherein the valve housing and the staging reservoir are removably connected at respective mating sealing surfaces that, when brought together, form a seal that defines a plane, and wherein the coupler and fluid output are on one side of the plane, and at least the majority of the primary volume is on the other side of that plane;
  wherein the control valve is biased toward the closed position;
  wherein the device is rotatable from a storage position where fluid within the primary reservoir is below the coupler, to a staging position where fluid within the primary reservoir is at least partially above the coupler, and a dispensing position where the fluid within the primary volume is above the fluid outlet; and
  whereby to allow a desired amount of fluid to be dispensed from the primary reservoir to the primary volume, the device is rotated from a storage position to a staging position where fluid is blocked, the control valve is moved to an open position, and is further rotatable to a dispensing orientation different from the staging orientation to dispense desired amount of fluid from the staging reservoir through the staging reservoir outlet.

14. The device of claim 13, wherein the coupler further includes an air return opening to allow air into the primary reservoir.

15. The device of claim 14, wherein the device further comprises a check valve connected to the air return opening to allow air into the primary reservoir through the air return opening while preventing fluid from exiting the primary reservoir through the air return opening.

16. The device of claim 15, wherein the check valve comprises:
  a check valve housing configured to receive air from the air return opening via an air conduit;
  a movable seal disposed within the check valve housing;
  a check valve seat in the check valve housing between the air conduit and the movable seal; and
  one or more check valve outlets, wherein air coming through the air conduit toward the check valve pushes the movable seal away from the check valve seat and flows out of the check valve housing through the one or more check valve outlets, and wherein fluid coming through the one or more check valve outlets pushes the movable seal against the check valve seat, preventing fluid from entering the air conduit.

17. The device of claim 15, wherein the check valve is a duckbill valve configured to receive air from the air return opening via an air conduit.

18. The device of claim 13, wherein the device is rotated about a first axis in a first direction to a staging orientation, and rotated about a second direction to orient the device in a dispensing orientation, wherein the first direction and second direction are substantially perpendicular.

* * * * *